United States Patent
Lambert et al.

(10) Patent No.: US 10,951,924 B2
(45) Date of Patent: Mar. 16, 2021

(54) VIDEO ENCODER

(71) Applicant: DIGITAL BARRIERS SERVICES LTD., London (GB)

(72) Inventors: Robert Lambert, Renfrewshire (GB); Gordon Innes, Strathaven (GB); Andrew Didsbury, Milngavie (GB)

(73) Assignee: Digital Barriers Services Ltd., London (GB)

( * ) Notice: Subject to any disclaimer, the term of this patent is extended or adjusted under 35 U.S.C. 154(b) by 129 days.

(21) Appl. No.: 15/550,753

(22) PCT Filed: Oct. 21, 2015

(86) PCT No.: PCT/GB2015/053149
§ 371 (c)(1),
(2) Date: Aug. 11, 2017

(87) PCT Pub. No.: WO2016/128701
PCT Pub. Date: Aug. 18, 2016

(65) Prior Publication Data
US 2018/0035135 A1    Feb. 1, 2018

(30) Foreign Application Priority Data

Feb. 13, 2015 (GB) .................................... 1502434

(51) Int. Cl.
*H04N 21/2187* (2011.01)
*H04N 21/234* (2011.01)
(Continued)

(52) U.S. Cl.
CPC ......... *H04N 21/2187* (2013.01); *H04N 7/183* (2013.01); *H04N 7/185* (2013.01);
(Continued)

(58) Field of Classification Search
CPC ... H04N 21/2187; H04N 7/183; H04N 21/814
(Continued)

(56) References Cited

U.S. PATENT DOCUMENTS 5,237,610 A * 8/1993 Gammie .............. H04N 7/1675
380/228
5,761,438 A    6/1998 Sasaki
(Continued)

FOREIGN PATENT DOCUMENTS

| AU | 2015382316 A1 | 8/2017 |
| CA | 2976431 A1 | 8/2016 |

(Continued)

OTHER PUBLICATIONS

GB 1502434.2 Search Report dated Aug. 14, 2015, 4 pages.
(Continued)

*Primary Examiner* — Wing F Chan
*Assistant Examiner* — Leon Y Tseng
(74) *Attorney, Agent, or Firm* — Nixon & Vanderhye PC

(57) ABSTRACT

A video encoder (2) is disclosed for sending video data to a server (4) over a channel. A video compressor (16) can compress video data using an adjustable compression factor. A multiplexer/pack constructor (18) can receive compressed video from the compressor, together with non-video data, and can queue data for transmission. A bandwidth monitor (20) is provided for monitoring the performance of the channel based on the behaviour of transmitted data packets, including their round-trip travel time to and from the server (4). The compressor (16) can modify the adjustable compression factor based on the performance of the channel, as determined by the bandwidth monitor, and the amount of non-video data received by the packet constructor. This can permit transmission of non-video data without disrupting the live video feed or introducing any delay.

20 Claims, 17 Drawing Sheets

(51) Int. Cl.
*H04N 21/2343* (2011.01)
*H04N 21/24* (2011.01)
*H04N 21/61* (2011.01)
*H04N 7/18* (2006.01)
*H04N 21/236* (2011.01)
*H04N 21/6583* (2011.01)
*H04N 21/81* (2011.01)

(52) U.S. Cl.
CPC . *H04N 21/23406* (2013.01); *H04N 21/23614* (2013.01); *H04N 21/234354* (2013.01); *H04N 21/2402* (2013.01); *H04N 21/6131* (2013.01); *H04N 21/6583* (2013.01); *H04N 21/814* (2013.01)

(58) Field of Classification Search
USPC .......................................................... 709/231
See application file for complete search history.

(56) References Cited

U.S. PATENT DOCUMENTS

| | | | |
|---|---|---|---|
| 2001/0035912 A1* | 11/2001 | Cooper | H04N 9/475 |
| | | | 348/513 |
| 2006/0095401 A1* | 5/2006 | Krikorian | H04N 19/172 |
| 2006/0095944 A1 | 5/2006 | Demircin et al. | |
| 2010/0208798 A1 | 8/2010 | Melpignano et al. | |
| 2010/0246395 A1 | 9/2010 | Itaya et al. | |
| 2010/0318675 A1 | 12/2010 | Nassor et al. | |
| 2011/0249073 A1 | 10/2011 | Cranfill et al. | |
| 2012/0076199 A1 | 3/2012 | Gao et al. | |
| 2012/0147946 A1 | 6/2012 | Gao et al. | |
| 2013/0156095 A1* | 6/2013 | Li | H04N 21/233 |
| | | | 375/240.02 |
| 2013/0247126 A1 | 9/2013 | Bennett et al. | |
| 2013/0268984 A1* | 10/2013 | Salinger | H04L 47/806 |
| | | | 725/109 |

FOREIGN PATENT DOCUMENTS

| | | |
|---|---|---|
| CN | 107580781 A | 1/2018 |
| EP | 3257251 A1 | 12/2017 |
| JP | H07170292 A | 7/1995 |
| JP | 2005027208 A | 1/2005 |
| JP | 3858274 | 9/2006 |
| JP | 2009207084 A | 9/2009 |
| JP | 2010239288 A | 10/2010 |
| JP | 2011091715 A | 5/2011 |
| JP | 2013229831 A | 11/2013 |
| JP | 2018509085 A | 3/2018 |
| KR | 20170137062 A1 | 12/2017 |
| WO | 00/54222 A1 | 9/2000 |
| WO | 2013046698 A1 | 4/2013 |
| WO | 2016/128701 A1 | 8/2016 |

OTHER PUBLICATIONS

PCT/GB2015/053149 International Search Report and Written Opinion dated Jan. 21, 2016, 12 pages.
PCT/GB2015/053149 International Preliminary Report on Patentability dated Feb. 17, 2017, 7 pages.
International Preliminary Report on Patentability for PCT/KR2014/003908 dated Oct. 25, 2016.
Office Action of Japanese Application No. 2017-542377, dated Apr. 16, 2019, 9 Pages.
First Examination Report dated Aug. 13, 2020 in corresponding Indian Application No. 201727029135, 6 pages.

* cited by examiner

VIDEO ENCODER

CROSS-REFERENCE TO RELATED APPLICATIONS

This application is a National Phase of International Application No. PCT/GB2015/053149 filed Oct. 21, 2015, currently pending, which designated the U.S. and that International Application was published under PCT Article 21(2) in English. This application also includes a claim of priority under 35 U.S.C. § 119(a) and § 365(b) to British patent application No. GB 1502434.2 filed Feb. 13, 2015, the entirety of which is hereby incorporated by reference.

The invention relates to a communications system, including a video encoder or an adaptive video multiplexer for transmitting compressed video data, which may be multiplexed with other data, over a channel. In particular, the invention relates to a video encoder that can regulate the rate at which data are transmitted in the channel to ensure that video can be provided with low latency.

A variety of techniques have been developed to allow video to be transmitted over low bandwidth channels. These techniques have numerous applications, including video telephone calls, video streaming and remote video surveillance.

In some applications it is important to be able to provide 'live' video over these low bandwidth channels. 'Live' video is a common term, but it is actually not possible to provide truly 'live' video in a communications system because a variety of factors introduce small delays. This means that the video displayed on a viewer's screen normally has a slight delay in comparison to the video captured by the camera. Delays can be introduced by transmission, compression/decompression, rendering at a user device, dropped frames, and queuing/buffering. In one example, a delay can be introduced if the transmission system attempts to transmit a video frame with a data size that exceeds the immediately available bandwidth; this can occur if video is transmitted over a link with a variable bandwidth, such as a cellular link. In these circumstances the large video frame must be queued and buffered, meaning that it can only be received with a delay. Over time this can create an accumulated latency, meaning that the video displayed on a viewer's screen lags somewhat behind real-time. In some security surveillance applications this type of latency in transmitted video can be a critical problem.

A delay can also be introduced to video at a viewer's device if there are pressures to transmit other types of data over the wireless channel. This can reduce the bandwidth that is available for video, which can increase the likelihood that video frames will need to be queued and buffered before transmission.

One option for reducing the risk of a delay is to use a high rate of compression for video data so that its data rate is maintained below the average bandwidth of the channel. This can allow video data to be transmitted successfully even if bandwidth varies or additional data is transmitted in the channel. A disadvantage of this approach is that video may be compressed more than is necessary, which means that the available bandwidth may not be fully utilised.

An object of the invention is to provide a video encoder or an adaptive video multiplexer and a method that can minimise the delay with which video is transmitted over low bandwidth channels.

According to the present invention there is provided a video encoder configured to send video data over a channel, the encoder comprising: a compressor configured to compress video data using an adjustable compression factor; a packet constructor configured to receive compressed video from the compressor, to queue data for transmission, to construct data packets from the queued data, and to transmit the constructed data packets over the channel; and a bandwidth monitor configured to monitor the performance of the channel based on the behaviour of transmitted data packets, wherein the video compressor is configured to modify the compression factor based on at least one property of the queued data, and in response to the performance of the channel, as determined by the bandwidth monitor.

In this way the encoder can optimise the compression of video data so that it can adapt to availability of bandwidth in the channel. Video transmission can therefore be optimised for a variable bandwidth channel, such as a cellular link. If the bandwidth monitor detects that the available bandwidth in the channel is low, such that the channel is struggling, then it may instruct the video compressor to use a higher compression factor. This can allow video to be sent with reduced quality so that the available bandwidth is not exceeded. On the other hand, if the bandwidth monitor detects that there is additional bandwidth available in the channel then it may instruct the video compressor to use a lower compression factor. This can allow live video data to be transmitted with the highest quality permitted by the channel conditions.

The adjustable compression factor can also be modified according to at least one property of the queued data. For example, the compression factor may be adjusted if data have been queued for transmission but not yet sent. In these circumstances the compression factor may be increased. This can allow video to be sent at a reduced data rate. This can reduce the demand placed on the channel by video to allow space in the channel for the queued data to be sent. The queued data may be video or non-video data.

The bandwidth monitor is preferably configured to measure the time required to transmit data packets over the channel. This may be indicative of the performance of the channel. If the transmission time for data packets is high, or increases, then this may be indicative of a channel that has low bandwidth availability. In these circumstances the compression factor may be increased in order to decrease the data rate (and the quality) of transmitted video, and therefore decrease data requirements on the channel.

The video encoder may comprise a receiver configured to receive acknowledgements from a server, which acknowledgements are sent in response to the transmitted data packets. Preferably the bandwidth monitor is configured to measure the time required for an acknowledgement to be received, following transmission of a data packet. In this way, the video encoder can measure the round-trip time for data packets and acknowledgements to be sent to and from the server.

In a preferred embodiment the quantity of queued but not yet transmitted data is used to adjust the compression factor used by the video compressor. Alternatively, or in addition, the type of queued data may be relevant. In one example, the compression factor may be adjusted in dependence on whether the queued data are video data, time critical data or non-time critical data. The amount of queued data may also be influential, and a higher compression factor may be used if there are large amounts of unsent data in the queue.

In some embodiments data may be re-queued for transmission if acknowledgements are not received from a server. If re-queued data are pending the compressor may use a higher compression factor. This can reduce the data rate of live video to allow space in the channel for re-sending data.

This can allow data to be re-sent without disrupting the continuous supply of live video data.

The packet constructor is preferably configured to receive non-video data for transmission in the channel. The compressor may modify the compression factor in response to performance of the channel and the amount of non-video data received by the packet constructor (and queued for transmission). If non-video data is received by the packet constructor then video quality can be reduced, by adjusting the compression factor, in order to free up bandwidth for non-video data in the channel. Non-video data can therefore be sent in the channel, together with the video data, without introducing any time delay in the live video feed. This can be achieved almost invisibly from a viewer's perspective. Video quality would, of course, be decreased slightly, but a viewer would not be likely to notice this because video quality is dynamically changed anyway based on the performance of the channel.

Preferably video and non-video data are transmitted between a single port in the video encoder and a single port in a server. In this way, all types of data can be multiplexed in a single channel.

The packet constructor may comprise at least one buffer for video and non-video data. Preferably the bandwidth monitor is configured to instruct the video compressor to modify the compression factor in response to the presence of non-video data that are queued in the relevant buffer. In this way, non-video data can be prioritised for transmission. If any non-video data is present in a buffer then this may be detected and the compression factor may be adjusted accordingly to make space for the non-video data in the channel.

The non-video data may comprise higher priority data and lower priority data, which may be time critical data and non-time critical data respectively. In one arrangement the higher priority data are transmitted without delay whenever they are received by the packet constructor. In one example this may include time critical data such as an alarm, which must be communicated as soon as possible in a surveillance scenario.

Promptly transmitting time critical data may disrupt the supply of live video, causing data to queue in a buffer. The detection of queued data may prompt modification of the compression factor. This can allow live video data to be transmitted at a lower data rate to allow time for the queued data to be transmitted.

The lower priority data may be non-time critical. In one arrangement the compression factor may be adjusted when non-time critical data is received by the packet constructor. This can allow space in the channel for the non-time critical data.

Preferably non-video data, such as non-time critical data, is transmitted only when all of the queued video data has been transmitted. Thus, the non-time critical data can be transmitted only when a video buffer has been emptied and there is available bandwidth in the channel. In other words, the compression factor can be modified when non-video data is received by the packet constructor in order to empty the queue of video data and to make bandwidth available for the non-video data. In this way, non-video data can be transmitted without introducing any latency in the video data, which is essential in some security surveillance applications. By modifying the compression factor video data can be transmitted promptly but with a slightly lower quality so that bandwidth can be made available for the non-video data without disrupting the live video feed.

According to another aspect of the invention a communication system is provided comprising a video encoder as previously defined and a server for receiving data packets over the channel. The server may relay the received data packets to a viewer over an internet channel. Preferably a broadband channel is provided between the server and the viewer. The broadband channel preferably has a significantly higher bandwidth than the channel between the server and the encoder which means that data optimisation in this channel is less important. In some circumstances the bandwidth between the server and a viewing client may also require management. In one embodiment the server to instruct the encoder to reduce the maximum bandwidth value that is used as the upper limit for the bandwidth adaption process.

Typically the channel bandwidth from the server to the viewing client is higher than the channel bandwidth between the encoder and server. Where this is not the case, a comparable mechanism can be utilised to manage the bandwidth where by the server instructs the encoder to reduce the maximum bandwidth at which it can generate data.

According to yet another aspect of the invention there is provided a method of sending video data over a channel, the method comprising the steps of: compressing video data using an adjustable compression factor; queueing data for transmission; constructing data packets including the compressed video; transmitting the constructed data packets over the channel; monitoring the performance of the channel based on the behaviour of transmitted data packets; and modifying the compression factor based on the performance of the channel and at least one property of the queued data.

According to yet another aspect of the invention there is provided a non-transitory computer readable storage medium having a computer program stored thereon, the computer program comprising processor readable instructions that, when executed, direct a device to perform actions comprising: compressing video data using an adjustable compression factor; queuing data for transmission; constructing data packets including the compressed video; transmitting the constructed data packets over the channel; monitoring the performance of the channel based on the behaviour of transmitted data packets; and modifying the compression factor based on the performance of the channel and at least one property of the queued data.

Method features may be provided as corresponding apparatus features and vice-versa.

Embodiments of the present invention will now be described, by way of example only, with reference to the accompanying drawings in which.

Figure 1:
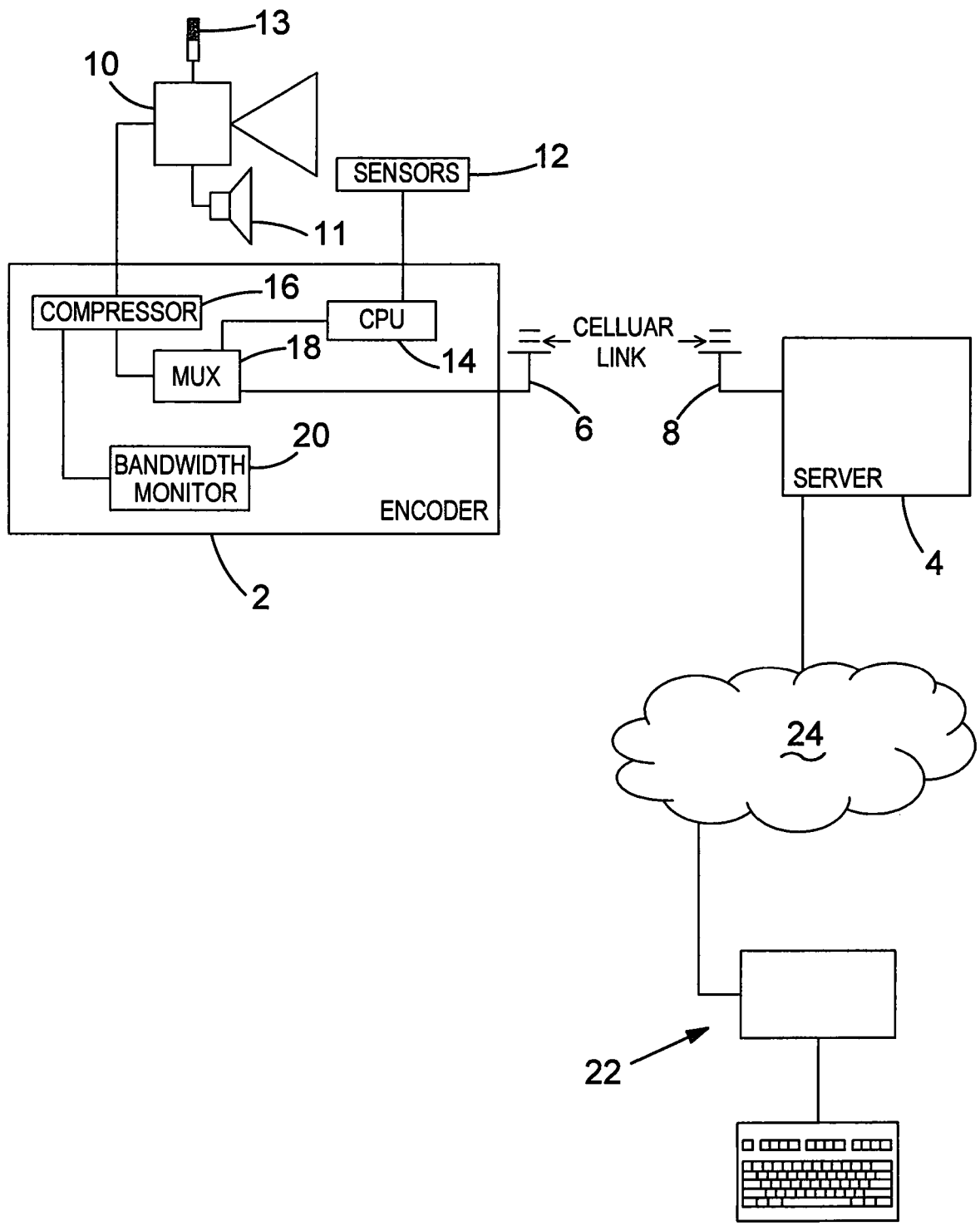
FIG. 1 is a schematic view of a transmission system in an embodiment of the present invention.

FIG. 1 is a schematic view of a transmission system including a video encoder 2 and a server 4 with respective cellular transceivers 6, 8. The encoder 2 is operable to send video data, time-critical data and non-time critical data to the server 4 over the cellular link. The server 4 is operable to send time-critical data and non-time critical data to the encoder 2 over the cellular link.

The server 4 is connected to user devices 22 over a conventional network 24, such as the internet. A number of alternative connections may be used between the server 4 and the user devices 22, including low bandwidth channels. The server 4 is configured to relay video and/or other data received from the encoder 2 to user devices 22 over the internet. In general a higher capacity connection is provided between the server 4 and user devices 22 than is possible in the cellular link between the server 4 and the encoder 2. Thus, it is generally possible to relay video data to the user devices 22 without introducing any further delay in the video because of a low availability of bandwidth.

The encoder 2 is connected to a video camera 10 and security sensors 12. The security sensors 12 may include temperature sensors, trip wire sensors, strain gauges and the like. Sensors 12 can make detections and send data to a CPU 14 in the encoder 2. The video camera 10 includes a microphone 13 and a loud speaker 11. The microphone 13 can capture sound data for transmission to the server 4, and the loud speaker 11 can be used to play sound data received from the server 4.

The video camera 10 is configured to capture video from a scene and provide it to a compressor 16 in the encoder 2. The compressor 16 is operable to compress the video using an adjustable compression factor. A multiplexer 18 receives compressed video from the video compressor 16 and also receives time-critical and non-time critical data from the CPU 14. These data are multiplexed into a single channel and transmitted to the server 4 over the cellular link.

The encoder includes a bandwidth monitor 20 which is configured to monitor the behaviour of data packets that have been transmitted in the channel. The bandwidth monitor 20 is also operable to instruct the video compressor 16 to change the adjustable compression factor in response to changing conditions in the channel. The operation of the bandwidth monitor 20 is described in further detail below.

Figure 2:
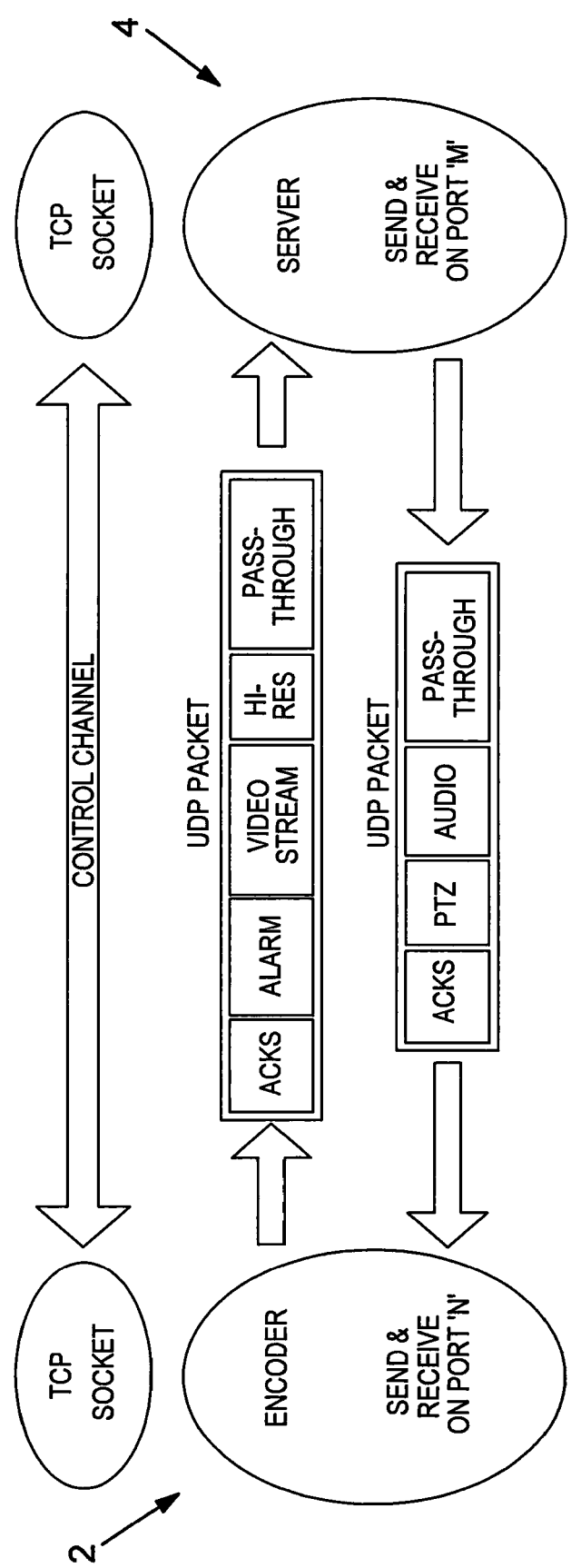
FIG. 2 is schematic view of the communications architecture between an encoder and a server in an embodiment of the invention.

FIG. 2 is a schematic view of the communications architecture between the encoder 2 and the server 4. Data are transferred between the encoder 2 and the server 4 using a single TCP link and a single UDP stream. A single port is used on the server 4 and the encoder 2 for all UDP traffic.

The TCP link is provided to establish a connection from the encoder 2 to the server 4 to provide for dynamic IP address assignment. This control channel is then used to initiate a UDP stream. Thereafter the only traffic on the TCP link is periodic keep-alive messages to ensure that routing tables are maintained for the link between the encoder 2 and server 4.

Once the UDP stream is established the multiplexer 18 in the encoder 2 issues packets at the minimum frequency necessary to maintain datagram routing tables between the encoder 2 and the server 4. If no data are available for transmission then the payload will be no more than a few bytes. As data is generated for transmission the packet rate and packet size will increase to a maximum rate. The server 4 will similarly issue UDP packets back to the encoder 2, but shall normally only issue packets in response to received packets.

The UDP stream can be closed if there are no data to exchange, where this would reduce the volume of "keep-alive" data and therefore reduce any data usage costs. Once the UDP stream is closed the server 4 must use the TCP link to reopen the UDP stream in order to initiate normal operation. In the event that the UDP stream is closed, the encoder 2 can send time critical data such as an alarm signal via the TCP control link.

Figure 3:
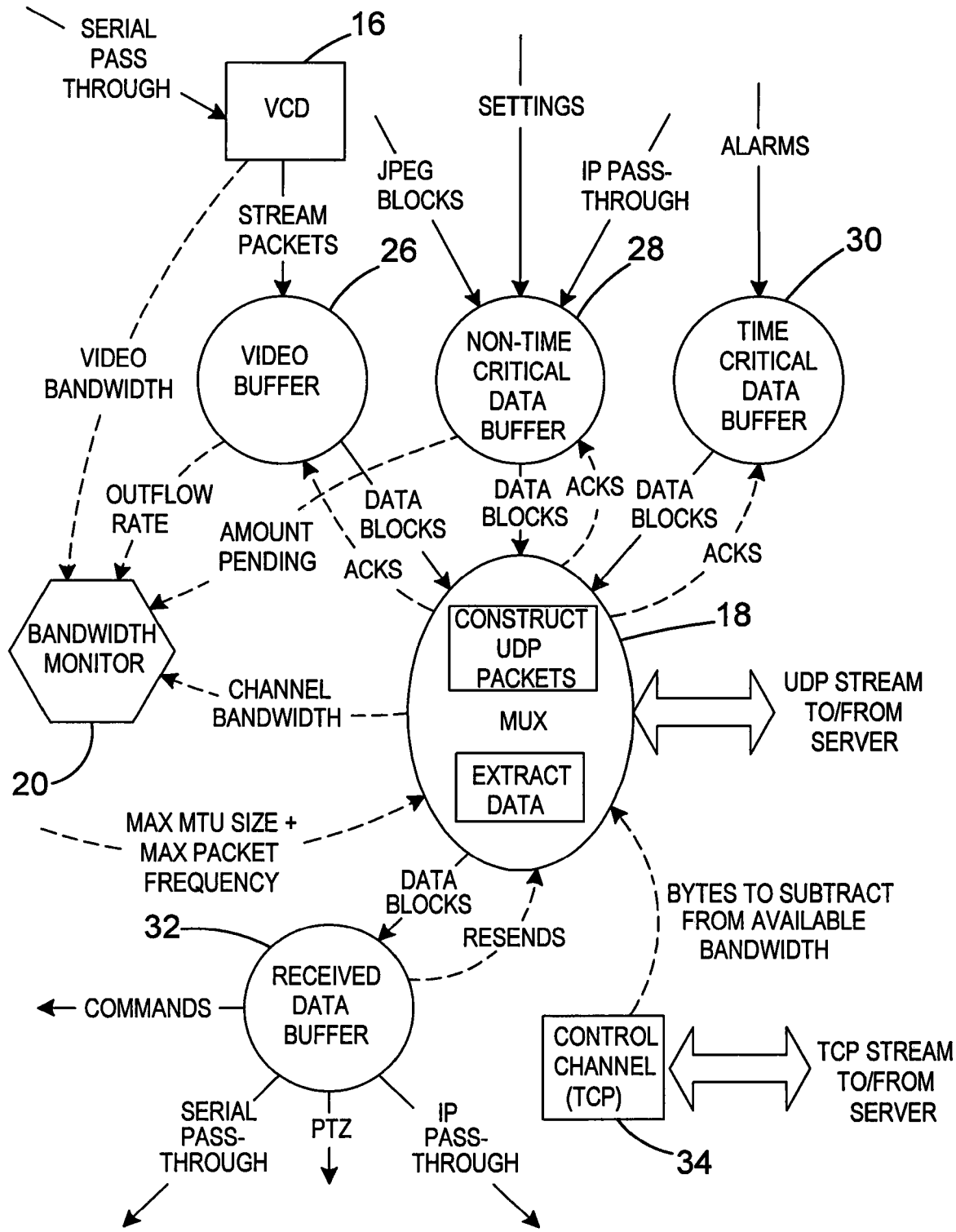
FIG. 3 is a schematic diagram showing the flow of data in a video encoder.

FIG. 3 is a schematic diagram showing the flow of data in the encoder 2. The multiplexer 18 receives three types of data from respective buffers 26, 28, 30, and each type of data is handled differently. First, the multiplexer 18 receives video from the video buffer 26. Video is compressed by the video compressor 16, and the resultant data packets are loaded into the video buffer 26 directly. Second, the multiplexer 18 receives non-time critical data from the non-time critical data buffer 28. Third, the multiplexer 18 receives time-critical data from the time-critical data buffer 30. Examples of non-time critical data in the encoder 2 include high-resolution images, which can be transmitted to the server 4 on request, or retrieval of other data from encoder 2 data storage. Examples of time-critical data in the encoder 2 include alarm events which may be triggered by sensors 12 or audio data from the microphone 13.

Each buffer 26, 28, 30 provides data blocks to the multiplexer 18. The buffers 26, 28, 30 also receive acknowledgments from the server 4 in response to successful transmission of data packets. These acknowledgements permit data blocks to be removed from the respective buffers, as is explained in more detail with reference to FIGS. 5-11.

The video buffer 26 reports its outflow rate to the bandwidth monitor 20. Additionally, the non-time critical data buffer 28 reports its number of pending data blocks to the bandwidth monitor 20. Further, the multiplexer 18 reports the estimated availability of channel bandwidth to the bandwidth monitor 20. This allows the bandwidth monitor 20 to instruct the compressor 16 to adjust its compression factor in response to the behaviour of data packets in the channel, and bandwidth requirements of non-video data.

All of the buffers 26, 28, 30 also report the number of queued data blocks to the bandwidth monitor. This number of queued data blocks in the respective buffers 26, 28, 30 is also used to adjust the compression rate in the compressor 16, as will be explained in further detail below.

As well as sending data to the server 4, the multiplexer 18 also receives data from the server 4 and provides data blocks to a received data buffer 32. Thus, the multiplexer 18 is actually a multiplexer/de-multiplexer device. The received data can include video camera 10 telemetry, including steering instructions and/or pan, tilt, zoom (PTZ) instructions, audio data for the loud speaker 11 and firmware updates.

Figure 4:
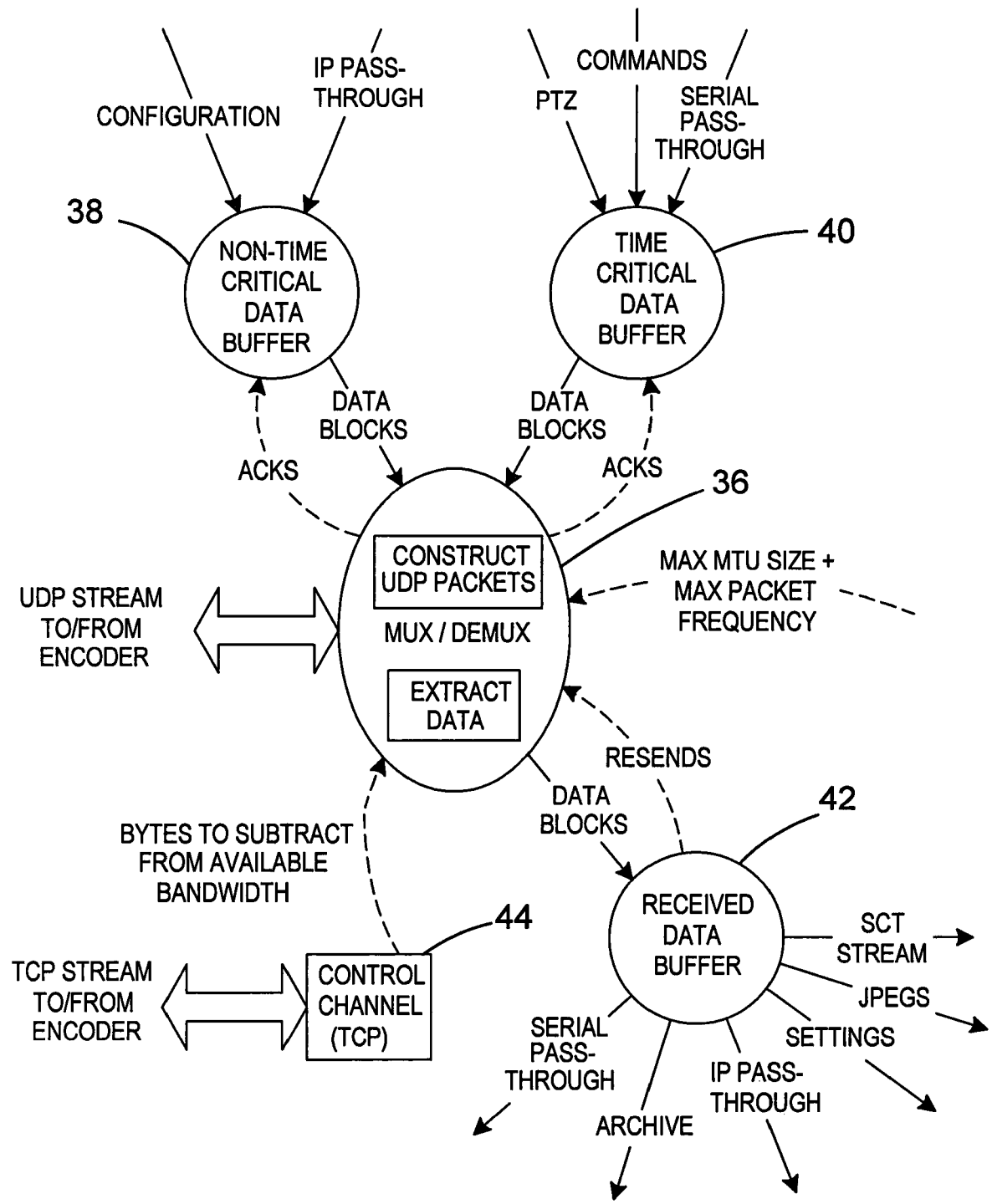
FIG. 4 is a schematic diagram showing the flow of data in a server, which is in communication with a video encoder.

FIG. 4 is a schematic diagram showing the flow of data in the server 4. The server 4 is operable to send non-time critical data and time critical data to the encoder 2. A multiplexer 36 in the server 4 can send and receive data from the encoder 2 (and is therefore both a multiplexer and a de-multiplexer). When sending data to the encoder 2, the multiplexer 36 receives data packets from a non-time critical data buffer 38 and a time critical data buffer 40. Examples of time critical data include camera telemetry instructions and/or audio messages to be repeated by the loud speaker 11 in the encoder 2. An example of non-time critical data is a software update for the encoder 2. Data from these buffers 38, 40 are combined in the multiplexer 36 and transmitted to the encoder 2 over the cellular link and the UDP stream. The buffers 38, 40 provide data blocks to the multiplexer 36 and receive acknowledgements if the relevant data packets are successfully received at the encoder 2. Only once the data blocks are successfully received are they deleted from the buffers 38, 40.

The server 4 also includes a received data buffer 42 for receiving data from the encoder 2. Of course, the received data include a video stream, and any time critical or non-time critical data.

The server 4 includes a TCP channel controller 44 for establishing and controlling the TCP link between the server 4 and the encoder 2. A corresponding TCP channel controller 34 is provided in the encoder 2.

The management of data blocks in the buffers 26, 28, 30 in the encoder 2 and the buffers 38, 40 in the server 4 is explained below with reference to FIGS. 5-11.

Figure 5:
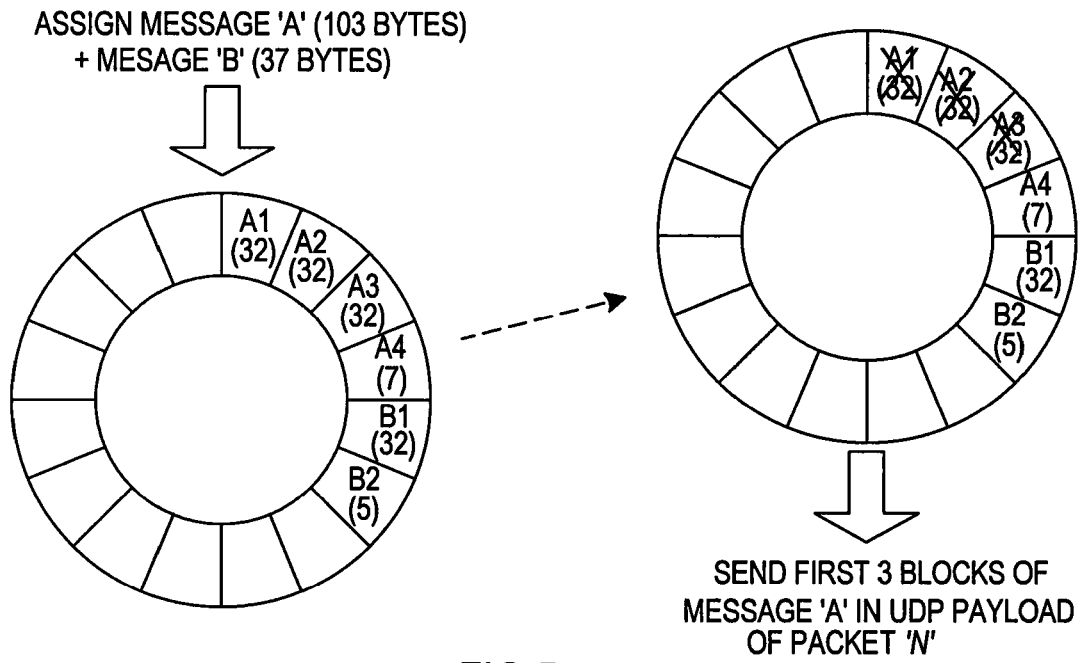
FIGS. 5 to 11 show examples of a buffer in an encoder, and depict scenarios demonstrating how data blocks are assigned and deleted.

In FIG. 5 a circular buffer is shown, having sixteen available blocks in which data can be assigned. In one example, two messages are assigned to the buffer, message A being 103 bytes and message B being 37 bytes. In the example of the video buffer 26, message A could correspond to a first video frame and message B could correspond to a second video frame. In this example, each block in the buffer can accommodate 32 bytes. Therefore, message A is split across four blocks and message B across two blocks. In this example, the multiplexer 18 is able to send 96 bytes of data in the next UDP payload (packet N) to be issued. Therefore, the multiplexer 18 copies the first three blocks from the buffer. These blocks are marked as sent, but not received and they are not yet deleted from the buffer.

Figure 6:
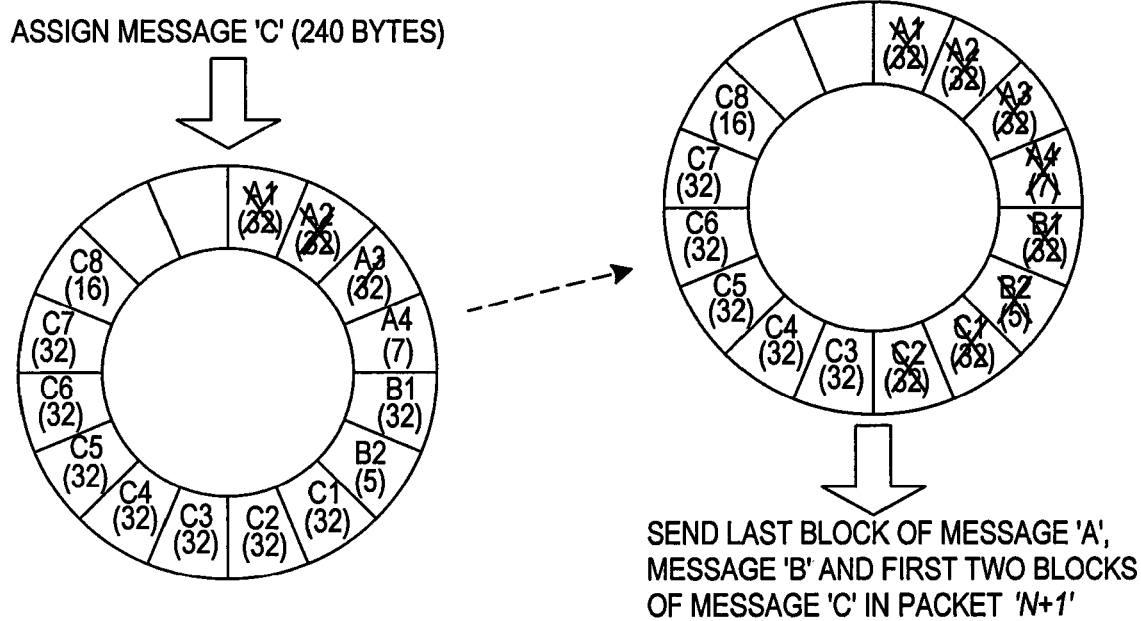

In FIG. 6, a new message is assigned to the buffer. The message is 240 bytes, and is assigned to five blocks. In this example, the multiplexer 18 has the ability to send five blocks in the payload of the next UDP packet, N+1. Thus, the multiplexer 18 copies the remainder of message A, all of message B, and the first two blocks of message C, to be assigned to UDP packet, N+1.

Figure 7:
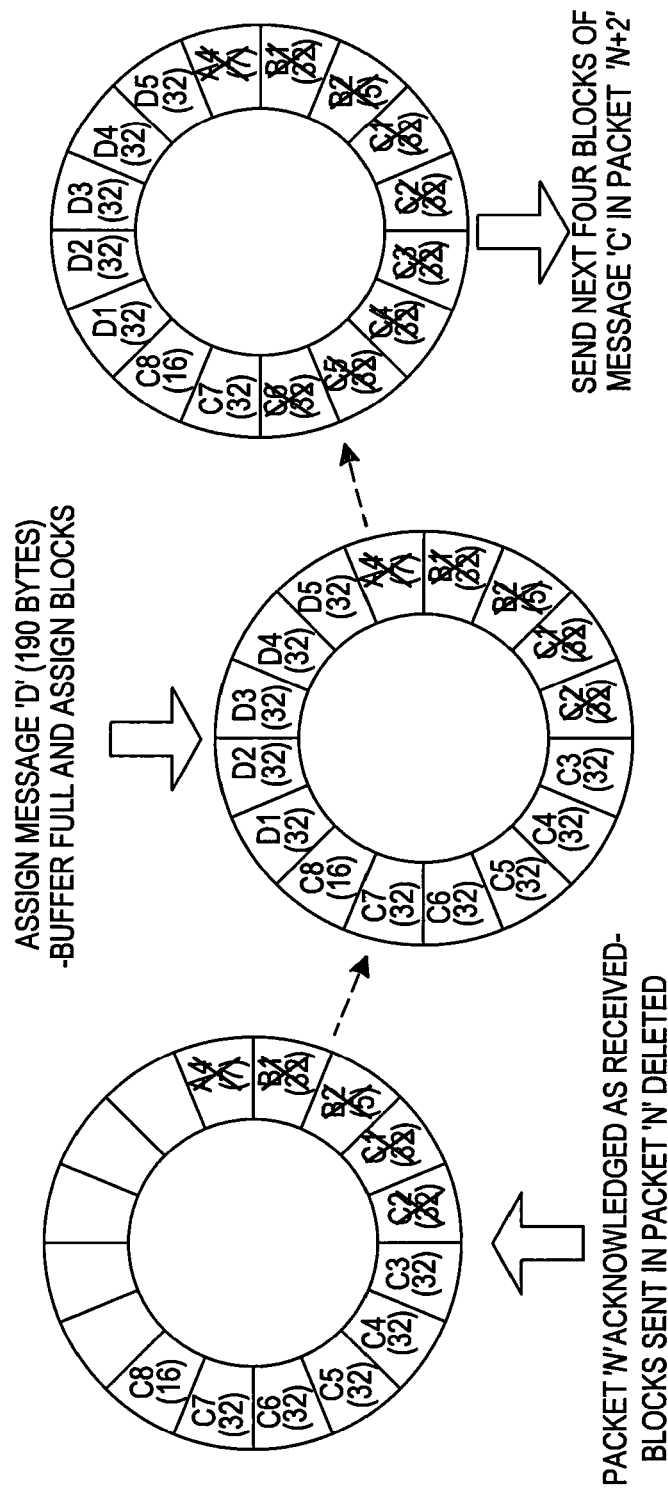

On receiving UDP packet N, the server 4 sends an acknowledgement as part of a UDP packet back to the encoder 2. In this example, the acknowledgement from the server 4 would identify that the first three blocks in the buffer have been correctly sent. Therefore, these blocks can be deleted from the buffer, as shown in FIG. 7. In the FIG. 7 example, a further message D is assigned to the buffer. Message D is 190 bytes and is split over six blocks. However, the buffer has only five blocks available. Therefore, the final block cannot yet be assigned to the buffer. The multiplexer 18 can then prepare the next UDP packet, N+2. In this example, the multiplexer 18 has the ability to send four blocks in the packet N+2. This corresponds to blocks C3-C6, which are copied by the multiplexer 18 and transmitted to the server 4 over the cellular channel.

Figure 8:
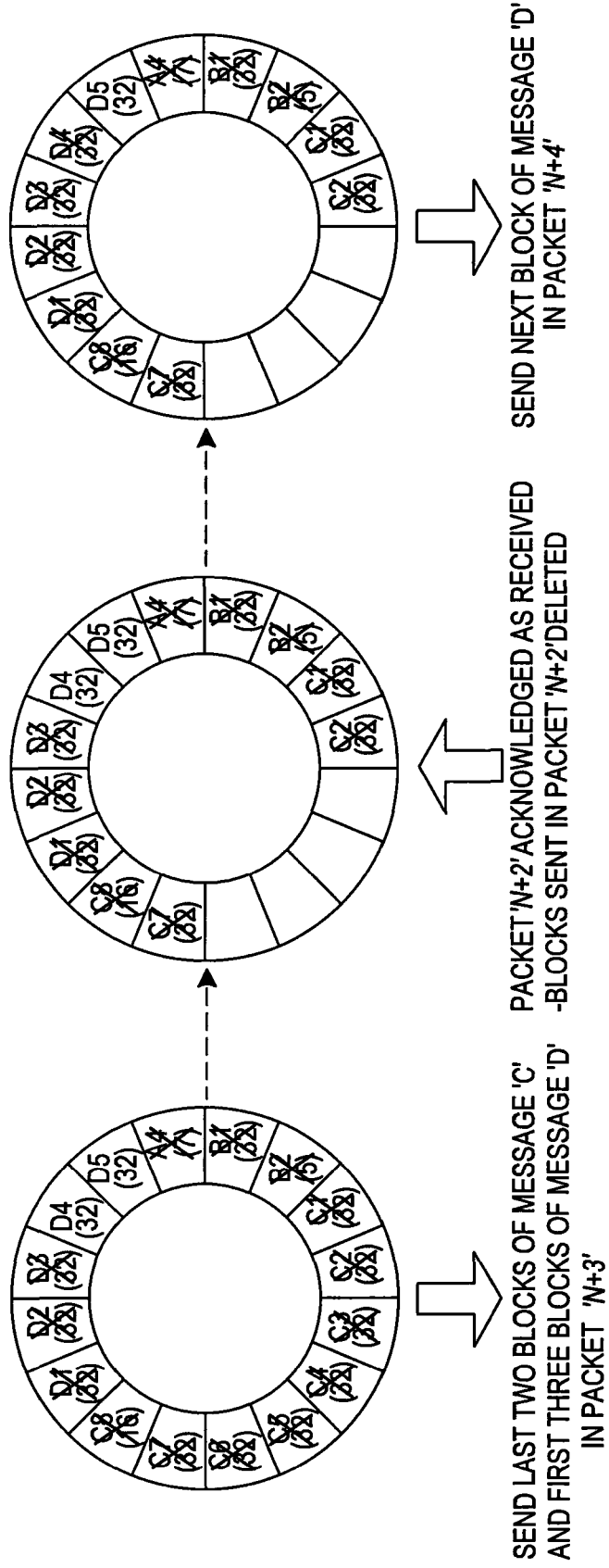

In FIG. 8, no more blocks can be assigned to the buffer because it is full. The multiplexer 18 then prepares packet N+3, which includes blocks C7, C8, D1, D2 and D3. These blocks are copied in packet N+3, which is then sent to the server 4. In this example, the server 4 fails to receive UDP packet N+1. However, packet N+2 is received successfully. FIG. 8 shows this process following the acknowledgement of packet N+2, with the corresponding blocks (C3-C6) deleted from the buffer. The blocks sent in packet N+1 remain in the buffer, however. The next step is for the multiplexer to prepare packet N+4, which in this example includes a single block (D4).

Figure 9:
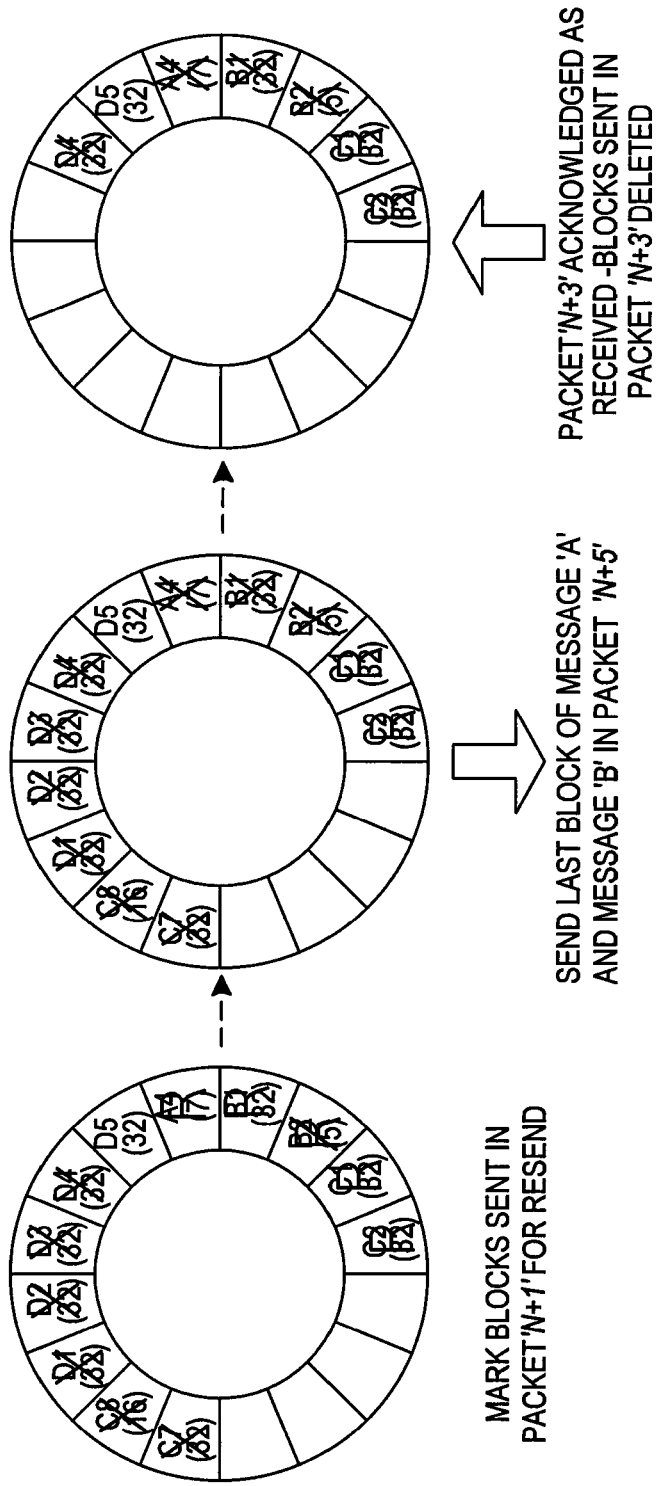

Since the packet N+1 is not received by the server 4, it is necessary to initiate a re-send, or else data would be lost. In this example, a re-send is initiated if the encoder 2 receives a specified number of subsequent packet acknowledgements. Additionally, or alternatively, a re-send may be initiated if an acknowledgement is not received within a predetermined time period. FIG. 9 shows the initiation of a re-send for packet N+1, with the relevant blocks marked to be re-sent. These blocks take priority over any unsent blocks in the buffer and are assigned according to the space in subsequent packets. Thus, packet N+1 is not necessarily re-sent in the same form. Rather, the blocks in original packet N+1 are allocated to new packets according to availability of space. In this example, multiplexer 18 prepares packet N+5. In this example, the packet N+5 has space for three blocks, and the blocks A4, B1 and B2 are allocated.

Figure 10:
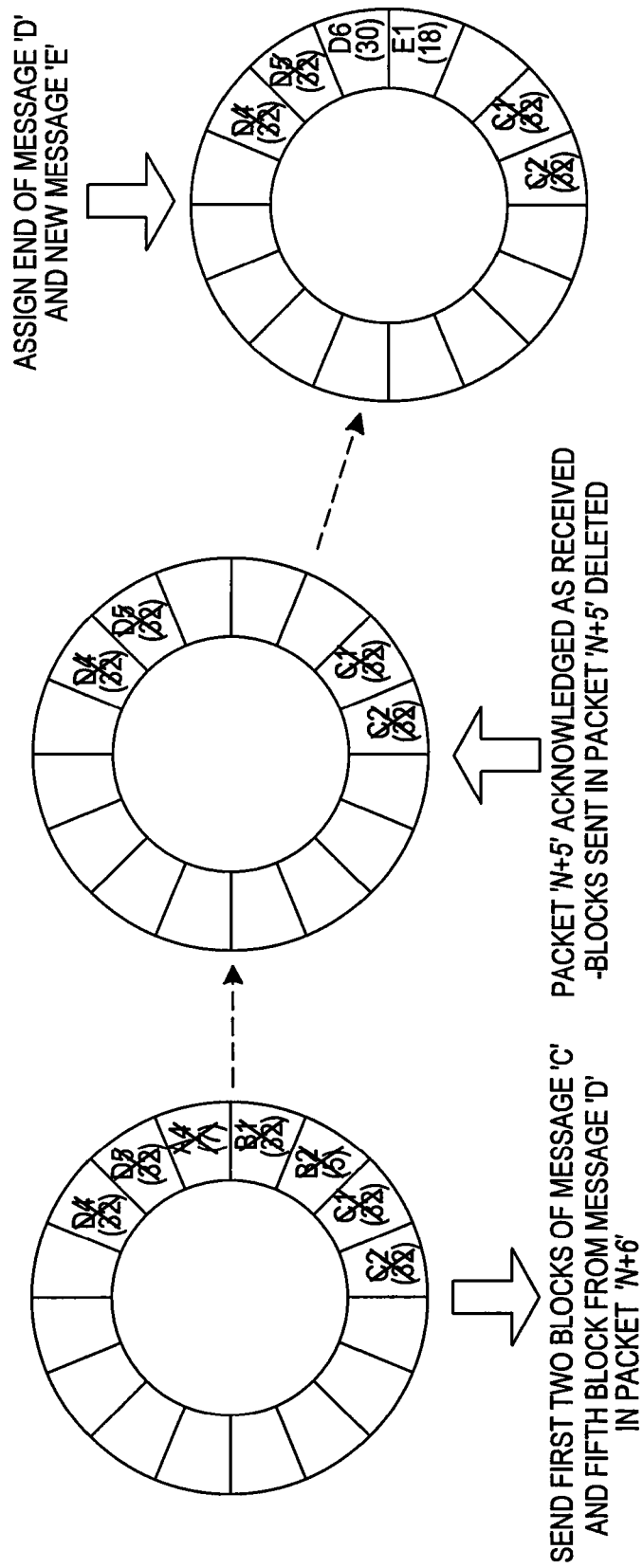

As shown in FIG. 10, in packet N+6 the multiplexer 18 allocates blocks C1 and C2, which are marked to be re-sent. There is space in packet N+6 for one more block, and therefore unsent block D5 is allocated. FIG. 10 also shows that the server 4 acknowledges packet N+5 as received. Therefore, the blocks associated with packet N+5 can be deleted from the buffer. There is now space available in the buffer. FIG. 10 shows that the remaining part of message D is written into the buffer, together with new message E which comprises a single block.

Figure 11:
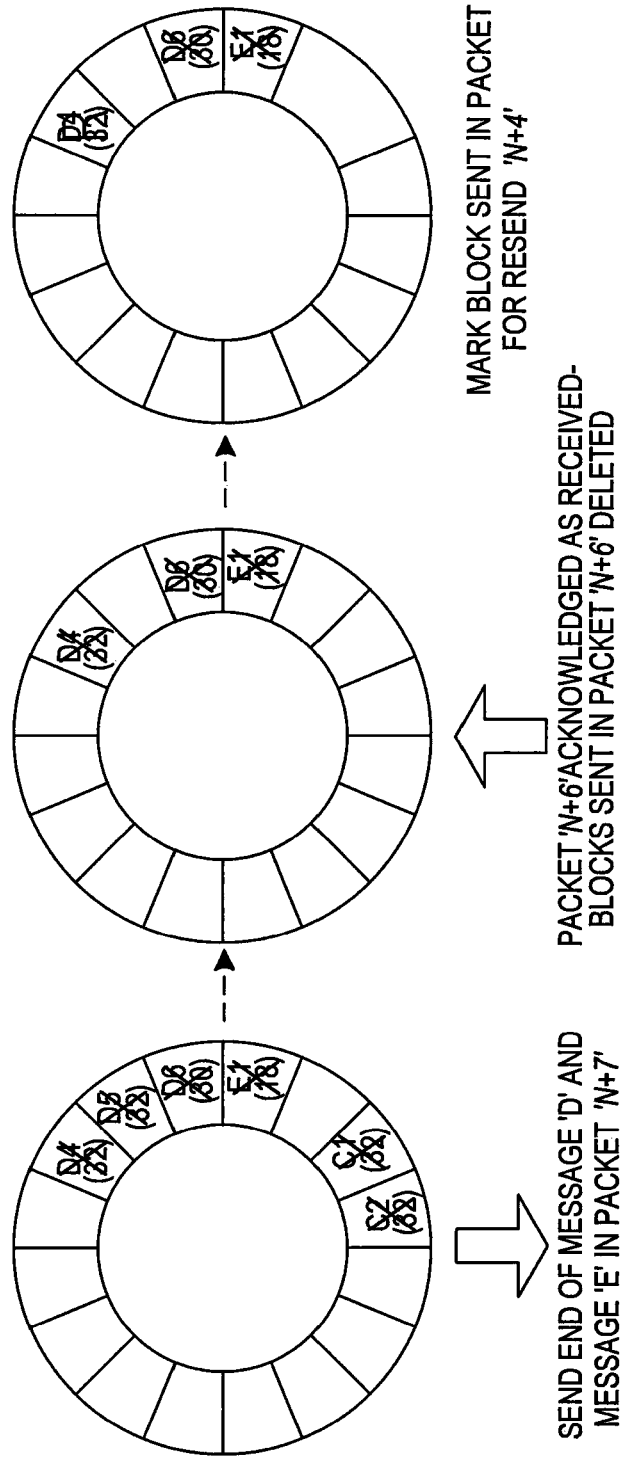

FIG. 11 shows the final part of the process for this example. In this example, the multiplexer 18 prepares packet N+7, which includes two blocks: D6 and E1. An acknowledgement is then received from the server for packet N+6, and the corresponding blocks are deleted from the buffer. Finally, the block corresponding to packet N+4 is marked to be re-sent, since the corresponding acknowledgement was not received from the server 4.

The assumption in the above example is that reliable transmission of message data is required. Thus, unacknowledged packets are carefully marked to be re-sent. In fact, reliable message transmission is not always required for an audio/video stream, and it may be appropriate to implement a variation for the video. Based on the link profile being used, the number of resends may be limited to a maximum number. Potentially this could be zero such that the block is deleted following the first send.

The encoder 2 and the server 4 comprise respective received data buffers 32, 42. These data buffers 32, 42 enable reconstruction of received messages to address out of order receipt and dropped packets. The message header is structured to allow an inference to be made by the receiver as to the full message length and type even if just a fragment is extracted from the payload of a UDP packet.

Figure 12:
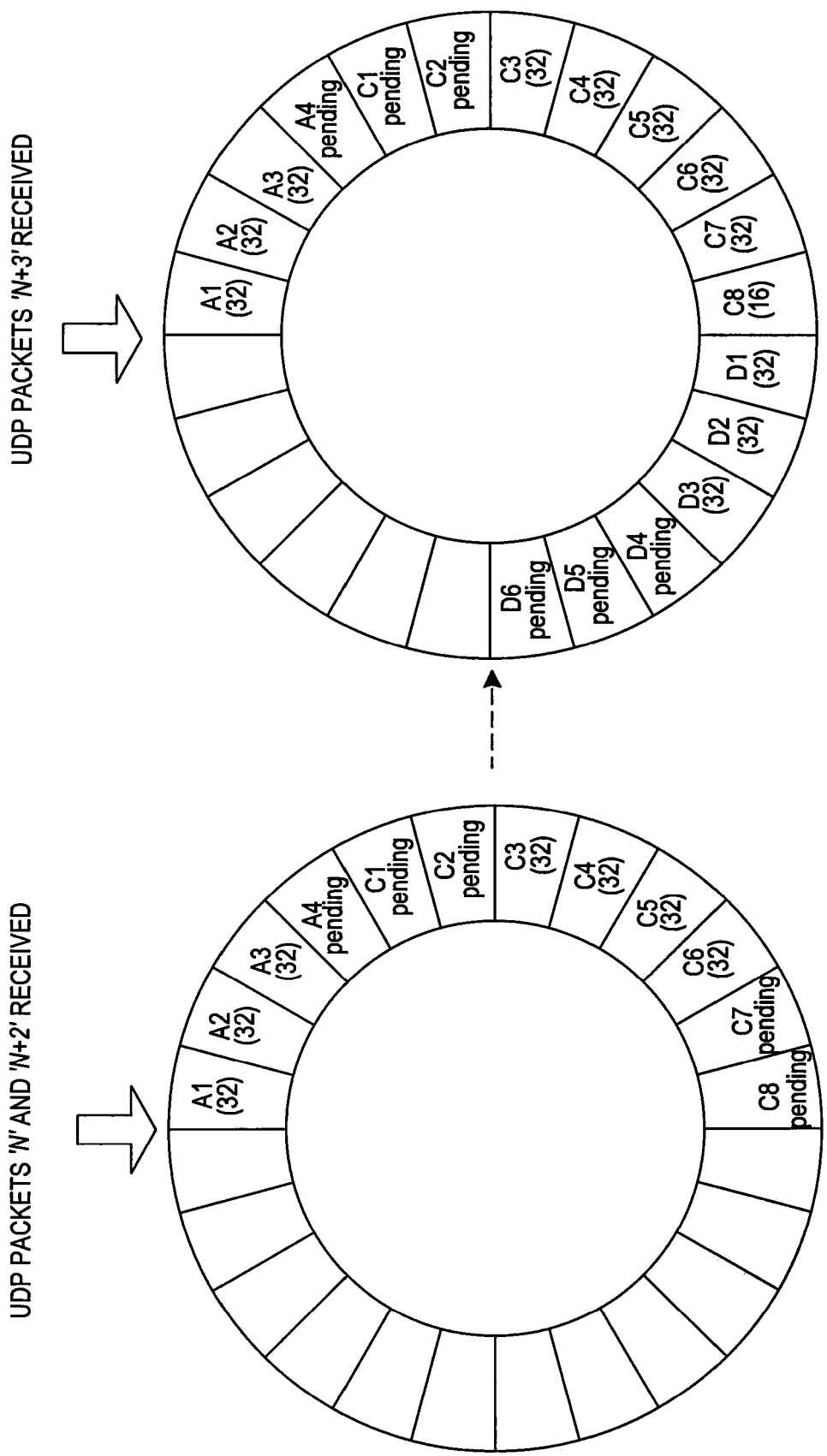
FIGS. 12 to 14 show examples of a received data buffer in a server, and depict scenarios demonstrating how data blocks are assigned and removed.

FIG. 12 shows an example of a circular receive data buffer 42, segmented into 32 byte blocks. In this example three incomplete messages have been received corresponding to packets N, N+2 and N+3. The information in packet N specifies that message A is held in four blocks and hence four blocks are reserved even though only three are supplied in the packet. Similarly packet N+2 codes message C as being eight blocks in length with blocks 3 to 6 inclusive being in the packet. Packet N+3 provides the final blocks for message C and the first three blocks of message D which is identified as being six blocks in length. In each case the appropriate number of blocks is reserved.

Figure 13:
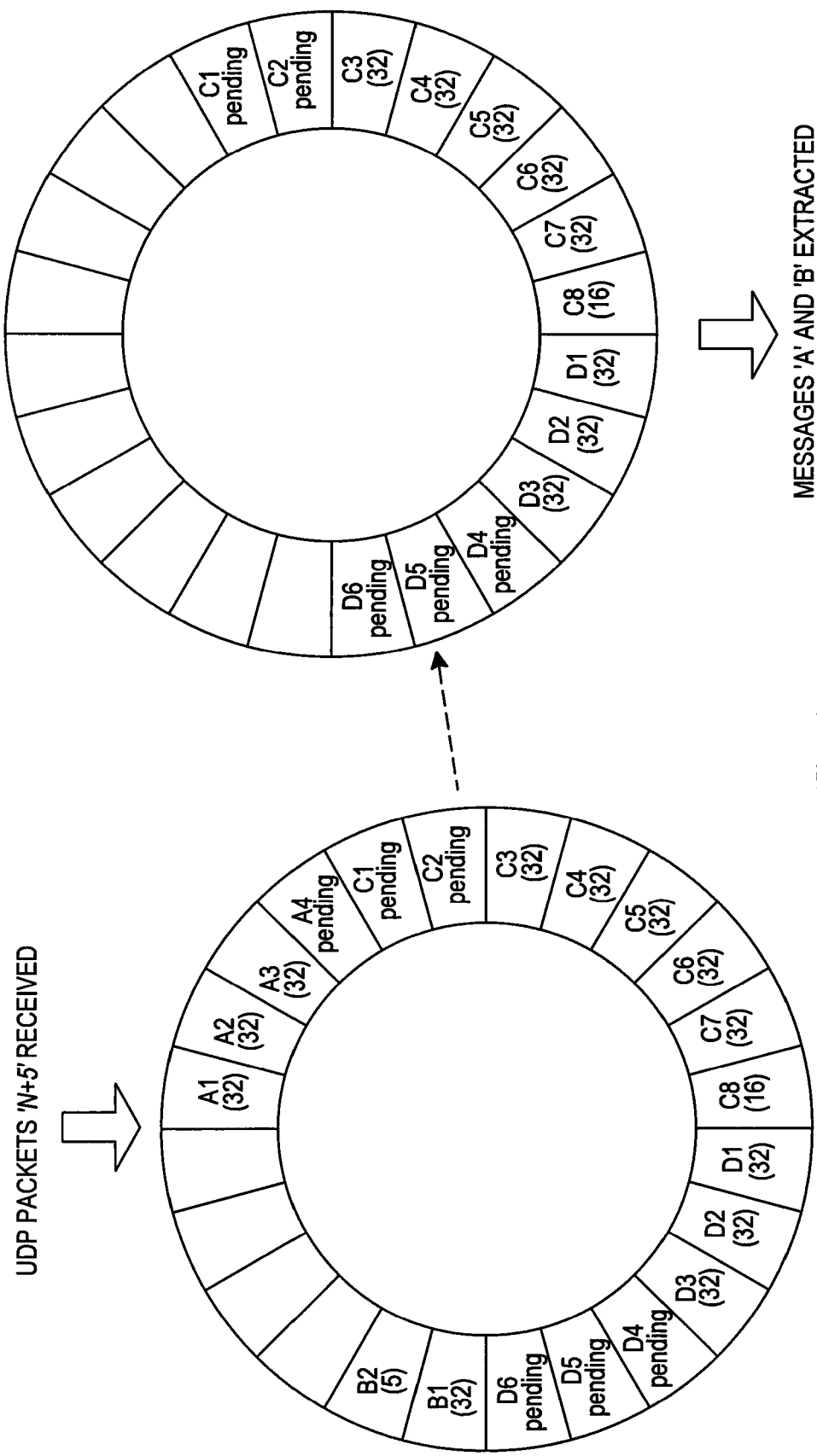
Figure 14:
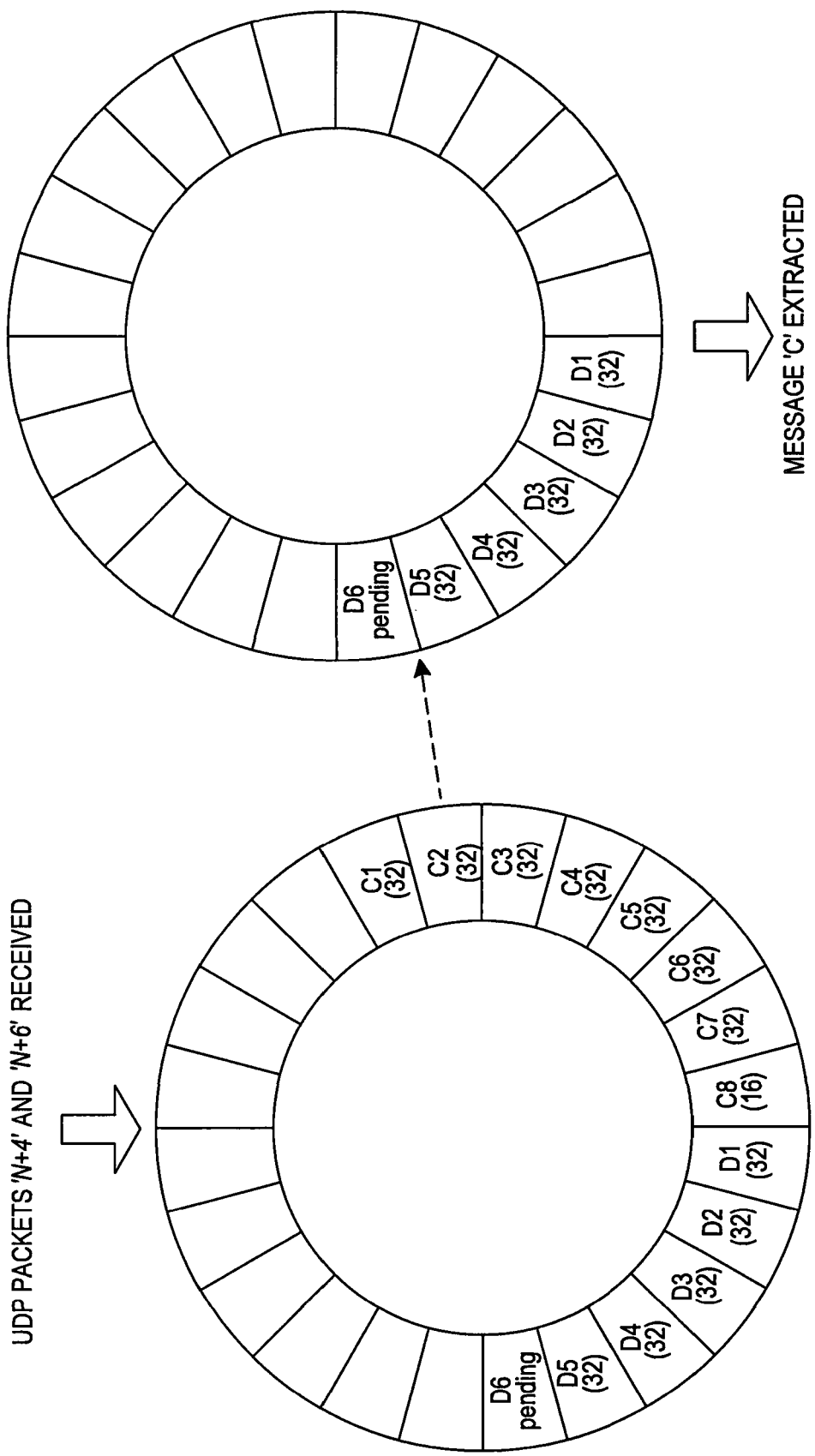

FIG. 13 shows the results from receiving packet N+5 in advance of N+4. Packet N+5 provides the missing first three blocks from message A and the two blocks from message B that were lost when packet N+1 was dropped. Messages A and B are extracted from the buffer as they are complete. FIG. 14 completes the sequence with the receipt of packets N+4 and N+6 after N+5. This completes message C which is extracted from the buffer.

There will be circumstances where the resend of data blocks does not occur. Specifically where video data is deemed to be not worth resending the receive buffer will retain the partial message resulting in the buffer effectively blocking. This design assumes that where new messages cannot be added to the receive buffer due to an existing incomplete message then the incomplete message is deleted to make space for the new message. In this way messages that are old will be discarded. The receive buffer should be sufficiently large so that incomplete messages are not discarded whist the resend process is still attempting to recover missing blocks.

Figure 15:
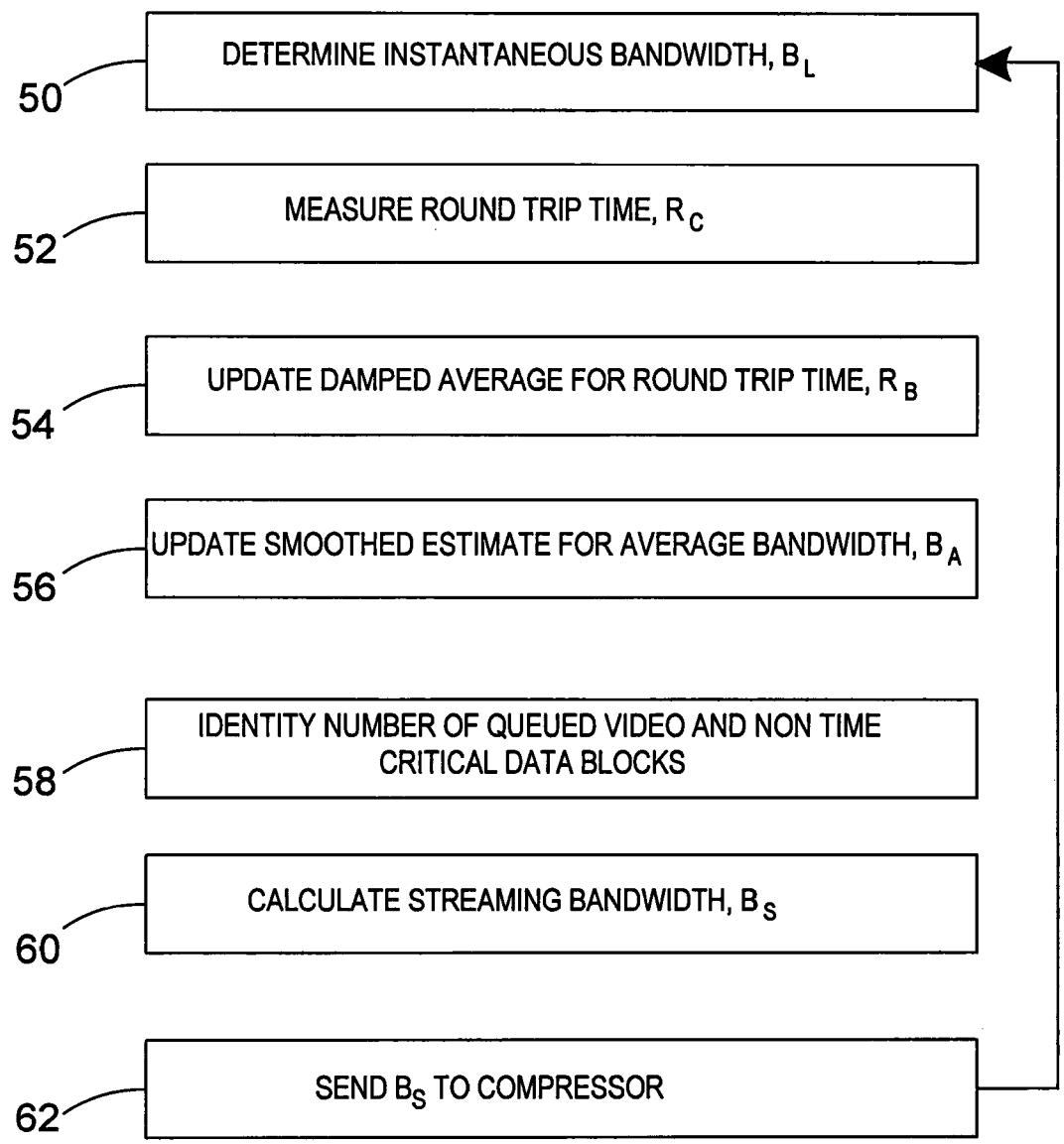
FIG. 15 is a flow diagram showing the operation of a bandwidth monitor in an encoder.

Operation of the bandwidth monitor 20 in the encoder 2 is now described with reference to the flow diagram in FIG. 15. At step 50 the bandwidth monitor 20 determines the instantaneous bandwidth in the channel, $B_I(t)$. This is calculated for each epoch, following generation of a UDP packet, according to the equation below:

$$B_I(t) \approx \frac{8000 \left[ \begin{array}{c} S_A(t) + N_A(t) - S_{NS}(t) - N_{NS}(t) + \\ S_{NS}(t-1) + N_{NS}(t-1) - S_A(t-1) - N_A(t-1) \end{array} \right]}{T(t) - T(t-1)}$$

where, $S_{NS}(t)$—The current number of bytes in the video buffer waiting to be sent $S_{NS}(t-1)$—The number of bytes in the video buffer waiting to be sent in the previous epoch $N_{NS}(t)$—The current number of bytes in the non-time critical buffer waiting to be sent $N_{NS}(t-1)$—The number of bytes in the non-time critical buffer waiting to be sent in the previous epoch $S_A(t)$—The current total number of bytes assigned to the video buffer $S_A(t-1)$—The previous total number of bytes assigned to the video buffer $N_A(t)$—The current total number of bytes assigned to the non-time critical buffer $N_A(t-1)$—The previous total number of bytes assigned to the non-time critical buffer $T(t)$—Time in ms at the current sample interval.

$T(t-1)$—Time in ms at the previous sample interval.

$B_A(t-1)$—The previous estimate of the average bandwidth in bits/sec $B_E$— The maximum permissible bandwidth in the channel $B_I(t)$—The instantaneous bandwidth in the channel Thus, the instantaneous bandwidth in the channel, $B_I(t)$, is the bandwidth utilised by the multiplexer 18 in sending the most recent UDP packet.

In fact, packets are not transmitted at equal time intervals. Therefore, to provide a more robust measure of instantaneous bandwidth, it is measured over a sliding window, taking in s sample points, according to the equation below:

$$B_I(t) \approx \frac{8000 \left[ \begin{array}{c} S_A(t) + N_A(t) - S_{NS}(t) - N_{NS}(t) + \\ S_{NS}(t-s) + N_{NS}(t-s) - S_A(t-s) - N_A(t-s) \end{array} \right]}{T(t) - T(t-s)}$$

At step 52 the bandwidth monitor 20 is configured to measure the round trip time for UDP packets between the encoder 2 and the server 4. This is achieved by measuring the time taken to receive an acknowledgement from the server 4, following transmission of a UDP packet by the encoder 2. The measured round trip time, $R_C(t)$, is a useful indicator for the performance of the channel. In a stable channel the round trip time is low, and has low variability. If the round trip time increases then this may be an indication that the bandwidth availability in the channel is less than is required by the encoder 2.

At step 54 the bandwidth monitor 20 is configured to update a damped average for the round trip time, $R_B(t)$. If the current value for the trip time is greater than the previous value for the damped average (i.e. $R_C(t) > R_B(t-1)$) then $R_B(t)$ is calculated according to the following equation.

$$R_B(t) = \frac{R_B(t-1) + R_C(t)}{2} + \frac{R_B(t-1) - R_C(t)}{\kappa[R_B(t-1) - R_C(t)] + 4}$$

Otherwise, $R_B(t)$ is calculated according to the following equation.

$$R_B(t) = R_B(t-1) + \frac{R_B(t-1) - R_C(t)}{\kappa[R_B(t-1) - R_C(t)] - 4} + 1$$

In these equations, $R_B(t)$—Is the estimate for round trip time for the current epoch $R_B(t-1)$—Is the previous estimate of the base round trip time $R_C(t)$—Is the current measurement of round trip time in ms $\kappa$—a damping factor controlling the rate of adaption The damped average for the round trip time can be a more useful measure than the current value for trip time because volatility in the channel can produce individual results that are not within normal limits. The equations above permit rapid downward adjustments of $R_B(t)$ to match currently observed values in trip time. However, upward adjustments of $R_B(t)$ are made more slowly. Careful selection of the damping factor, $\kappa$, may be required for optimal performance, depending on the characteristics of the cellular channel.

At step 56 the bandwidth monitor 20 is configured to update a smoothed average for the average bandwidth in the channel, $B_A(t)$, based on observed round trip times. The average bandwidth can be calculated according to the following equation.

$$B_A(t) = \frac{[F-1]B_A(t-1) + B_I + \delta[B_E - B_I]}{F}$$

where $B_A(t-1)$—Is the previous estimate of the average bandwidth in bits/sec $B_A(t)$—Is the new estimate of the average bandwidth in bits/sec $B_E$— Is a specified upper limit on the bandwidth in bits/sec $F$—Is a factor controlling the rate of adaption and $$\delta = \frac{2}{\pi} \tan^{-1}\left(\frac{R_B(t)}{R_C(t)}\right)$$

$B_A(t)$ can therefore provide a useful estimate of the currently available bandwidth in the channel. It can be appreciated from the above equation that $B_A(t)$ will increase if the current trip time is low relative to the damped average trip time (i.e. $R_C(t)<R_B(t)$). The maximum value for $B_A(t)$ is $B_E$, which is a defined limit for the bandwidth of the channel, according to its properties. Conversely, $B_A(t)$ will decrease if the current round trip time is high relative to the damped average trip time (i.e. $R_C(t)>R_B(t)$).

At step 58 the bandwidth monitor 20 is configured to monitor the number of video blocks assigned to the video buffer 26 and the number of non-time critical data blocks assigned to the non-time critical data buffer 28, but not yet sent ($S_{NS}(t)$ and $N_{NS}(t)$). These factors can be used in step 60 in the calculation of the streaming bandwidth, $B_S$.

At step 60 the bandwidth monitor 20 is configured to calculate the streaming bandwidth, $B_S$. The streaming bandwidth corresponds to the rate at which compressed data should be output by the compressor 16. Thus, if a lower streaming bandwidth is required then the compressor 16 must use a higher compression factor to convert the input video stream to compressed data at the required bandwidth. Conversely, if a higher streaming bandwidth is required then the compressor 16 can use a lower compression factor when compressing the input video stream. The compression performed by the compressor 16 is lossy, which means that a lower quality output is produced when a higher compression factor is used.

The streaming bandwidth, $B_S$, is calculated according to the equation below.

$$B_S = B_A(t)\left[1 - \frac{2}{\pi}\tan^{-1}\left(\frac{8[S_{NS}(t) + N_{NS}(t) + \sigma]}{B_A(t)}\frac{R_C(t)}{R_B(t)}\right)\right]$$

where σ represents the amount of data sent but unacknowledged over and above the allowance based on the current base round trip time;

$$\sigma = \begin{cases} 0 & \text{if } \omega \leq 0 \\ \omega & \text{otherwise} \end{cases} \text{ where } \omega = S_{SU}(t) + N_{SU}(t) - \frac{R_B(t) \times B_A(t)}{8000}$$

$S_{SU}(t)$—Is the current number of video bytes sent but not acknowledged $N_{SU}(t)$—Is the current number of non-time critical bytes sent but not acknowledged It can be appreciated that $B_S$ is small when the round trip time is high in comparison to the damped average for round trip time (i.e. when $R_C(t)>R_B(t)$). This means that a lower streaming bandwidth is used when the round trip time is high, which is indicative of a lower average bandwidth in the channel. The encoder 2 is able to adapt to changing conditions in the channel by reducing the quality of compressed video, and increasing the compression factor, when these conditions are detected.

The value for $B_S$ tends towards $B_A$ when the round trip time is low in comparison to the damped average for round trip time (i.e. when $R_C(t)<R_B(t)$). In other words, the streaming bandwidth takes a value which is close to the average bandwidth in the channel when conditions are favourable and the round trip time is low. This allows the compressor 16 to use a lower compression factor and allow transmission of higher quality video, when bandwidth appears to be available.

The calculation of $B_S$ also takes account of $S_{NS}(t)$, which is the number of bytes that are waiting to be sent in the video buffer 26. Specifically, $B_S$ is reduced if there is video data queued in the video buffer 26. This means that a higher compression factor is used for compressing subsequent video frames, which reduces pressure on the channel from video data. By reducing the data rate produced by the compressor 16 the multiplexer 18 is better able to clear the video buffer 26 in subsequent epochs.

In general $B_S$ is calculated in order to minimise video latency because it is normally undesirable for data to be queued in the video buffer 26. One way in which these bytes can accumulate in the video buffer 26 is if time critical data is sent from the time critical data buffer 30. Data assigned to the time critical buffer 30 takes priority over data in the video buffer 26 and the non-time critical data buffer 28. Thus, when time critical data are sent this typically causes data blocks to accumulate in the video buffer 26. The above equation shows that Bs is adjusted downwards in these circumstances. This can reduce the data rate of live video to allow the queued data in the video buffer 26 to be sent. This design allows time critical data to be prioritised over video data and sent to the server 4 as a matter of urgency. In a surveillance application time critical data could include the triggering of a switch or an infra-red (IR) sensor. It is possible to send an alarm including these data immediately when the data is available. Advantageously, the effect on the live video feed would normally be imperceptible to a human viewer at a user device 22.

Transmission failures may also cause video data to be queued in the video buffer 26. As described with reference to FIGS. 5 to 11, blocks may be activated for re-transmission in the video buffer 26 if acknowledgements are not received from the server 2. If any such blocks are present in the video buffer 26 then this may result in a downward adjustment of Bs. By reducing the data rate of live video it is possible to create space in the channel to re-transmit the relevant blocks.

It is not envisaged that data would be queued in the time critical data buffer 30 in normal operating conditions, as this would delay transmission of time critical data. This could only happen in circumstances where the generation rate of time critical data is greater than the instantaneous bandwidth in the channel, $B_I(t)$. This is unlikely to happen in most situations since the generation rate of time critical data is likely to be small in comparison to the bandwidth of the channel. However, should it happen then the video encoder 2 would cease sending video data so that the data queued in the time critical data buffer 30 can be cleared. The transmission of video data could then be re-started.

The calculation of $B_S$ also takes account of $N_{NS}(t)$, which is the number of non-time critical data blocks in the non-time critical data buffer 28. As can be appreciated from the equations above, the value of $B_S$ is decreased whenever non-time critical data is queued in the buffer 28. This reduces the amount of bandwidth that is consumed by video files in the channel in order to make bandwidth available for non-video data. This bandwidth is used in the multiplexer 18 in order to send non-time critical data, whenever it is required. This allows non-time critical data to be transmitted together with video data, without disrupting the live feed, by modifying the compression factor. Non-time critical data is transmitted only if the video buffer 26 is empty and bandwidth is available in the channel. In this way, the video data can always take priority over non-time critical data, and the non-time critical data is transmitted only once space has been created in the channel and $B_s$ has been adjusted so that the video buffer 26 is fully emptied. This can allow non-video data to be transmitted without introducing any latency for video data, which is essential in some security surveillance applications.

At step 62 the bandwidth monitor 20 sends its calculation for $B_S$ to the compressor 16. The compressor 16 then adjusts its compression factor so that compressed video is output at the desired streaming bandwidth.

The equations above for the calculation of $B_A(t)$ and $B_S$ involve use of the $\tan^{-1}x$ function, which is not available on some platforms and can be complex to evaluate.

It is possible to approximate both of these calculations to improve calculation speed.

If $R_B(t) \leq R_C(t)$ then $\delta$ may be approximated as $$\delta \approx \frac{691 R_B(t) R_c(t) - 178 R_B(t)^2}{1024 R_C(t)^2}$$

Else, $$\delta \approx 1 - \frac{691 R_C(t) R_B(t) - 178 R_C(t)^2}{1024 R_B(t)^2}$$

To simplify the calculation of $B_S$ it is possible to define Q as the weighted sum of the total data waiting to be sent plus the data sent but unacknowledged over and above the allowance based on the base round trip time where the weighting is based on the ratio of the current round trip time to the base round trip time; i.e.

$$Q = \frac{8 R_C(t)}{R_B(t)} \left[ S_{NS}(t) + N_{NS}(t) + \max\left(0, S_{SU}(t) + N_{SU}(t) - \frac{R_B(t) B_A(t)}{8000}\right) \right]$$

The streaming bandwidth $B_S$ can then be derived from Q and $B_A(t)$ as follows;

If $Q \leq B_A(t)$ then $$B_S \approx B_A(t) - \frac{Q[691 B_A(t) - 178 Q]}{1024 B_A(t)}$$

Otherwise $$B_S \approx \frac{B_A(t)^2 [691 Q - 178 B_A(t)]}{1024 Q^2}$$

Figure 16A:
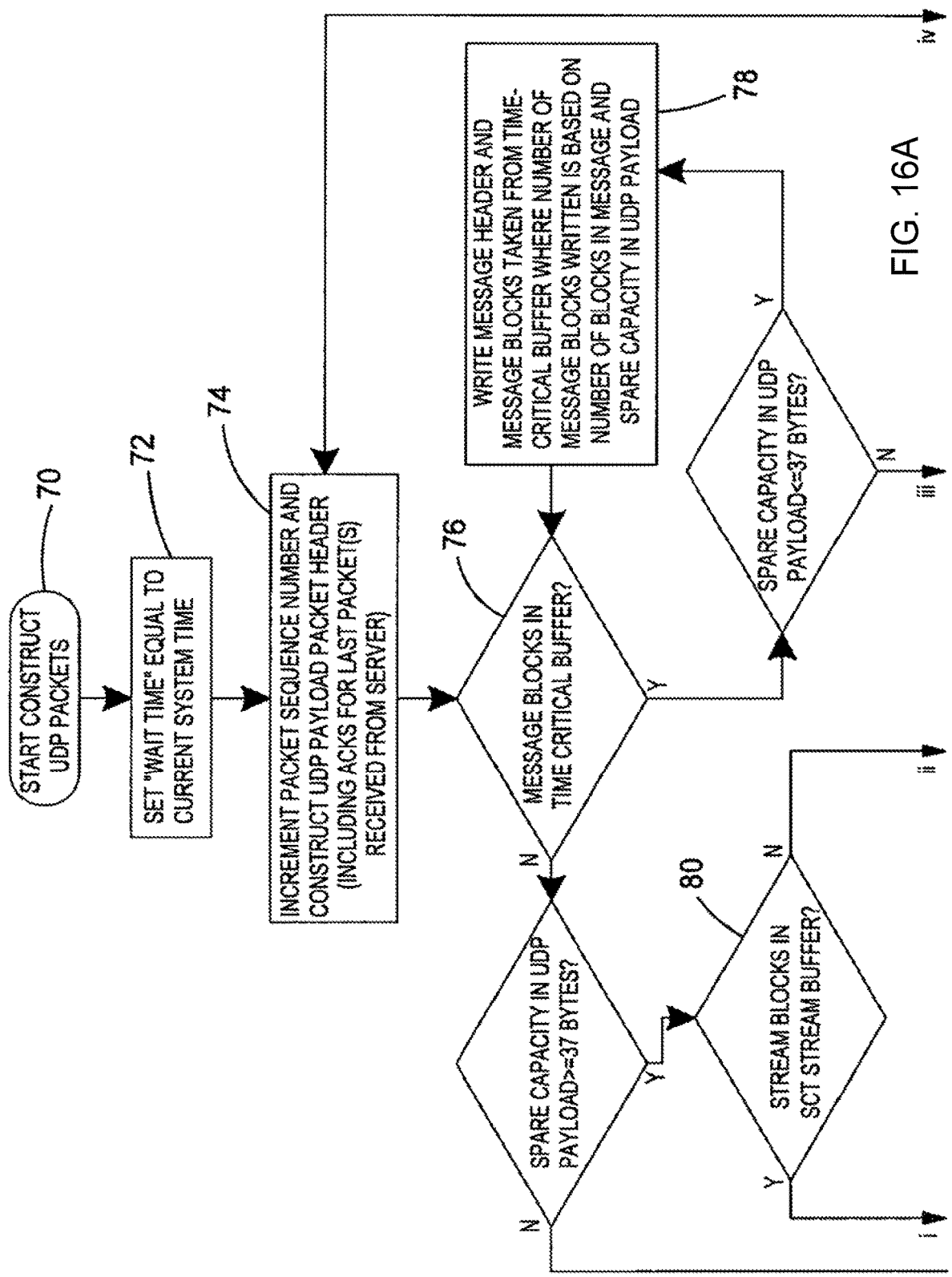
FIGS. 16A-16C present a logical flow diagram showing decision blocks in an encoder.
Figure 16B:
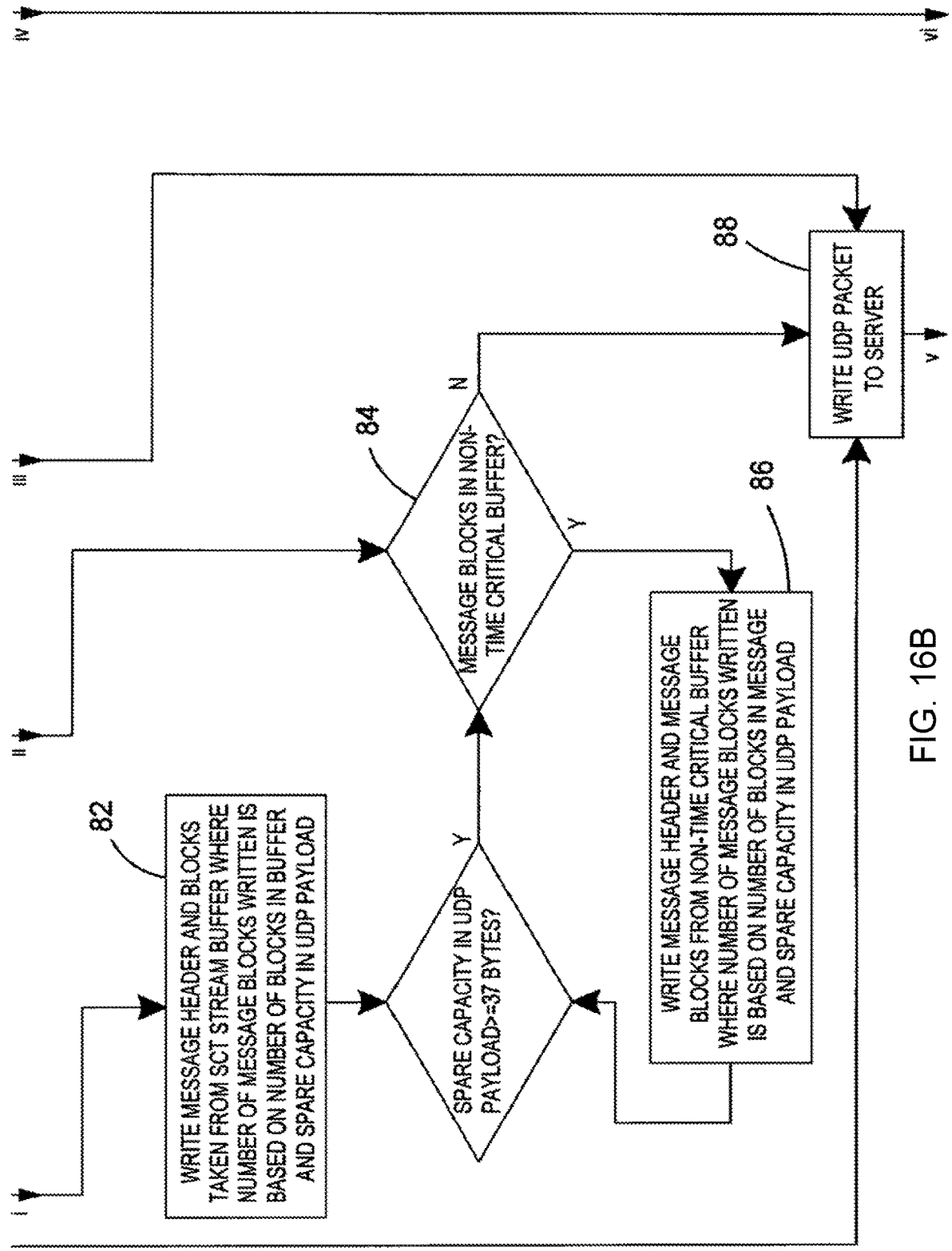
Figure 16C:
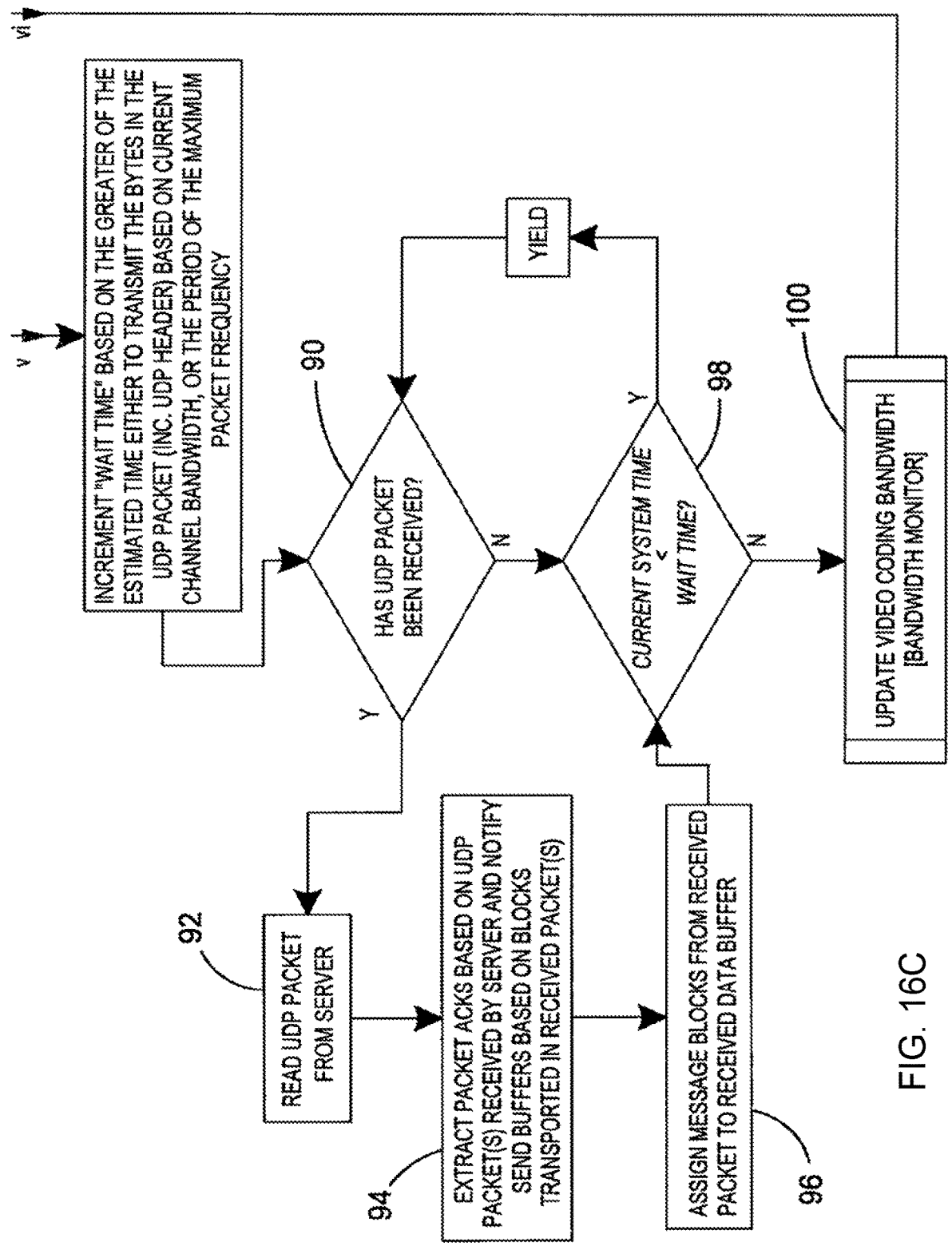

FIGS. 16A-16C present a logical flow diagram showing decisions taken in the encoder 2. At step 70 the video camera 10 begins recording video, and the multiplexer 18 begins generating UDP packets for sending to the server 4. At step 72 a 'wait to time' flag is set equal to current system time. At step 74 the multiplexer 18 increments packet sequence number and constructs a UDP payload packet header. At step 76 the multiplexer 18 analyses whether any blocks are present in the time critical data buffer 30. If any blocks are present in this buffer 30 then they are prioritised for inclusion in the UDP packet. Therefore, if there is spare capacity in the UDP payload (i.e. there is more than 37 bytes of available space) then message blocks from the time critical data buffer 30 are copied into the UDP payload at step 78. If there are no blocks in the time critical data buffer 30 then the multiplexer 18 again analyses whether there is any spare capacity in the UDP payload. If there is spare capacity then the multiplexer 18 analyses at step 80 whether there are any pending blocks in the video buffer 26. If any video blocks are present then these are copied into the UDP payload by the multiplexer 18 at step 82. If there is any spare capacity in the UDP payload then the multiplexer 18 analyses at step 84 whether there are any message blocks pending in the non-time critical data buffer 28. These blocks are copied into the UDP payload at step 86; in fact, the number of blocks copied into the payload depends on its spare capacity. When the UDP payload is full or there are no data blocks in any of the buffers 26, 28, 30 the UDP packet is sent to the server 4 at step 88. In this way the multiplexer 18 can prioritize time critical data in the UDP packet, followed by video data, and non-time critical data. This can allow time critical data to be sent without delay when it is present. Non-time critical data can be used to complete UDP packets whenever there is available space in the UDP packet. This can allow non-time critical data to be downloaded over a long period of time without causing disruption to the experience of live video at a user device 22, or to the prompt reporting of time critical data when necessary.

At step 90 the multiplexer 18 analyses whether a UDP packet has been received from the server 4. If a packet is received then it is read at step 92. Any UDP packet acknowledgements are extracted at step 94 and communicated to the relevant buffers 26, 28, 30 so that blocks can be deleted. The message blocks in the UDP packet are then extracted at step 96 and assigned to the received data buffer 32.

At step 98 the encoder 2 waits until the current system time is greater than or equal to the 'wait to time' flag. This allows enough time to pass for the encoder 2 to receive an expected UDP packet from the server 4. If the 'wait to time' period is exceeded then the bandwidth monitor 20 calculates the average bandwidth, $B_A(t)$ and the streaming bandwidth, $B_S$, at step 100, according to the process set out in FIG. 14. The process then returns to step 74 so that the multiplexer 18 can begin to construct the next UDP packet.

The invention claimed is:

1. A video encoder configured to send video data over a single channel between a single port at the encoder and a single port at a server, the encoder comprising a hardware processor configured to execute instructions corresponding to a video compressor, a packet constructor and a bandwidth monitor, wherein:

the video compressor is configured to compress video data using an adjustable compression factor;

the packet constructor is configured to receive compressed video from the video compressor, to queue data for transmission, to construct data packets from the queued data, and to transmit the constructed data packets over the single channel;

wherein the packet constructor is configured to receive non-video data for transmission in the single channel and configured to multiplex received unrelated non-video data with received compressed video data, and the bandwidth monitor is configured to monitor performance of the single channel based on a time required to transmit data packets over the single channel, wherein the video compressor is configured to modify the adjustable compression factor for video data based on an amount of unrelated non-video data received by the packet constructor that is queued but has not yet been transmitted, and in response to the performance of the single channel, as determined by the bandwidth monitor, and wherein the bandwidth monitor is configured to instruct the video compressor to modify the adjustable compression factor for video data so as to minimize video latency and in response to the performance of the single channel and the amount of unrelated non-video data received by the packet constructor.

2. The video encoder as claimed in claim 1, further comprising a receiver configured to receive acknowledgements from the server, which acknowledgements are sent in response to the transmitted data packets, wherein the bandwidth monitor is configured to measure a time required for an acknowledgement to be received, following transmission of a data packet.

3. The video encoder as claimed in claim 1, further comprising a receiver configured to receive acknowledgements from the server, which acknowledgements are sent in response to the transmitted data packets, and wherein the packet constructor is configured to re-queue data for transmission if an acknowledgement to a transmitted data packet is not received.

4. The video encoder as claimed in claim 1, wherein the packet constructor comprises at least one buffer for video and non-video data.

5. The video encoder as claimed in claim 4, wherein the bandwidth monitor is configured to instruct the video compressor to modify the adjustable compression factor in response to the presence of non-video data in the buffer.

6. The video encoder as claimed in claim 1, wherein the single channel is a wireless cellular link.

7. The video encoder as claimed in claim 1, wherein the bandwidth monitor is configured to modify the adjustable compression factor when non-video data is received by the packet constructor in order to empty the queue of video data, thereby making bandwidth available for the non-video data.

8. A transmission system comprising a video encoder as claimed in claim 1 and a server configured to receive the constructed data packets that are transmitted over the single channel.

9. The video encoder according to claim 1, wherein the compressor is configured to increase the adjustable compression factor so as to avoid or minimize queuing of video data.

10. The video encoder according to claim 1, wherein the compressor is configured to modify the adjustable compression factor irrespective of the quality of the transmitted video data.

11. The video encoder according to claim 1, wherein:
the non-video data comprise higher priority data, said higher priority data being non-video data the transmission of which takes priority over the transmission of video data, and
the packet constructor is configured to transmit higher priority data without delay whenever said higher priority data are received by the packet constructor.

12. The video encoder according to claim 1, wherein the non-video data comprise lower priority data, said lower priority data being non-video data where the transmission of video data takes priority over the transmission of the lower priority data.

13. The video encoder according to claim 12, wherein the packet constructor is configured to transmit lower priority data only when any queued video data have been transmitted.

14. The video encoder according to claim 12, wherein the adjustable compression factor is modified when lower priority data are received by the packet constructor in order to make space in the single channel for the lower priority data.

15. The video encoder according to claim 14, wherein the packet constructor is configured to transmit lower priority data only when any queued video data have been transmitted.

16. The video encoder according to claim 1, wherein:
the time required to transmit data packets is a round-trip time for data packets;
the non-video data comprise higher priority data, said higher priority data being non-video data the transmission of which takes priority over the transmission of video data, the packet constructor being configured to transmit said higher priority data without delay whenever said higher priority data are received by the packet constructor;
the non-video data comprise lower priority data, said lower priority data being non-video data where the transmission of video data takes priority over the transmission of the lower priority data;
the video compressor is configured to modify the adjustable compression factor when lower priority data are received by the packet constructor in order to make space in the single channel for the lower priority data;
the packet constructor is configured to transmit lower priority data only when any queued video data have been transmitted; and
the compressor is configured to modify the adjustable compression factor irrespective of the quality of the transmitted video data.

17. A method of sending video data over a single channel between a single port at an encoder and a single port at a server, the method comprising:
(a) receiving and compressing video data using an adjustable compression factor based on a quantity and a type of data that is queued but has not yet been transmitted;
(b) queuing the compressed video data for transmission over the single channel;
(c) receiving and queuing non-video data for transmission over the single channel, and multiplexing received non-video data with received compressed video data;
(d) constructing data packets including the compressed video and the non-video data, wherein the received non-video data and the received compressed video data are unrelated to one another;
(e) transmitting the constructed data packets over the single channel; and
(f) monitoring performance of the single channel based on a time required to transmit data packets over the single channel;
the method further comprising repeating (a)-(f) for subsequent video and non-video data and
(g) modifying the adjustable compression factor for video data based on an amount of unrelated non-video data received for construction in (d) that is queued but has not yet been transmitted, and in response to the performance of the single channel as determined in (f), the modification of the adjustable compression factor for video data being performed to minimize video latency.

18. The method as claimed in claim 17, wherein:
the monitoring comprises monitoring the performance of the single channel based on a round trip time for data packets over the single channel;
the non-video data comprise higher priority data, said higher priority data being non-video data the transmission of which takes priority over the transmission of video data, the method further comprising transmitting higher priority data without delay whenever said higher priority data are to be included in data packets; and the non-video data comprise lower priority data, said lower priority data being non-video data where the transmission of video data takes priority over the transmission of the lower priority data, the method further comprising:

modifying the adjustable compression factor when lower priority data are to be included in data packets in order to make space in the single channel for the lower priority data;

transmitting lower priority data only when any queued video data have been transmitted; and modifying the adjustable compression factor irrespective of the quality of the transmitted video data.

19. A non-transitory computer readable storage medium having a computer program stored thereon, the computer program comprising processor readable instructions that, when executed, direct a device for sending data over a single channel between a single port at an encoder and a single port at a server to perform actions comprising:

(a) receiving and compressing video data using an adjustable compression factor based on a quantity and a type of data that is queued but has not yet been transmitted;

(b) queuing the compressed video data for transmission over the single channel;

(c) receiving and queuing non-video data for transmission over the single channel, and multiplexing received non-video data with received compressed video data;

(d) constructing data packets including the compressed video and the non-video data wherein the received non-video data and the received compressed video data are unrelated to one another;

(e) transmitting the constructed data packets over the single channel;

(f) monitoring performance of the single channel based on a time required to transmit data packets over the single channel;

repeating (a) to (f) for subsequent video data and non-video data; and modifying the adjustable compression factor for video data based on an amount of unrelated non-video data received for construction in (d) that is queued but has not yet been transmitted, and in response to the performance of the single channel as determined in (f), the modification of the adjustable compression factor for video data being performed to minimize video latency.

20. The non-transitory computer readable storage medium as claimed in claim 19, wherein:

the monitoring comprises monitoring the performance of the single channel based on a round trip time for data packets over the single channel;

the non-video data comprise higher priority data, said higher priority data being non-video data the transmission of which takes priority over the transmission of video data, the actions further comprising transmitting higher priority data without delay whenever said higher priority data are to be included in data packets; and the non-video data comprise lower priority data, said lower priority data being non-video data where the transmission of video data takes priority over the transmission of the lower priority data, the actions further comprising:

modifying the adjustable compression factor when lower priority data are to be included in data packets in order to make space in the single channel for the lower priority data;

transmitting lower priority data only when any queued video data have been transmitted; and modifying the adjustable compression factor irrespective of the quality of the transmitted video data.

* * * * *